US012647940B2

(12) United States Patent
    Ji et al.

(10) Patent No.: US 12,647,940 B2
(45) Date of Patent:      Jun. 2, 2026

(54) PAGING EARLY INDICATIONS IN NON-TERRESTRIAL NETWORKS

(71) Applicant: QUALCOMM Incorporated, San Diego, CA (US)

(72) Inventors: Lianghai Ji, San Diego, CA (US); Huilin Xu, Temecula, CA (US); Linhai He, San Diego, CA (US); Liangping Ma, San Diego, CA (US); Qiang Wu, San Diego, CA (US); Jun Ma, San Diego, CA (US); Mohamad Sayed Hassan, Paris (FR); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/892,680

(22) Filed: Aug. 22, 2022

(65) Prior Publication Data

US 2024/0064698 A1      Feb. 22, 2024

(51) Int. Cl.
    *H04W 68/02*      (2009.01)
    *H04W 76/30*      (2018.01)

(52) U.S. Cl.
    CPC ........... *H04W 68/02* (2013.01); *H04W 76/30* (2018.02)

(58) Field of Classification Search
    CPC ... H04W 68/02; H04W 76/30; H04W 68/025; H04B 7/0695

(Continued)

(56) References Cited

U.S. PATENT DOCUMENTS

2020/0396591 A1 *  12/2020  Ou ........................ H04W 76/30
2022/0046540 A1     2/2022  Kwon et al.
(Continued)

FOREIGN PATENT DOCUMENTS

EP            4068872 A1 *  10/2022   ......... H04B 7/06952
WO     WO-2022126406 A1     6/2022

OTHER PUBLICATIONS

3GPP TS 38.304: "3rd Generation Partnership Project, Technical Specification Group Radio Access Network, NR, User Equipment (UE) procedures in Idle Mode and RRC Inactive state (Release 17)", Draft_38304-H10_V2, 3rd Generation Partnership Project, Mobile Competence Centre, 650, Route Des Lucioles, F-06921 Sophia-Antipolis Cedex, V17.1.0, France, Jul. 14, 2022, pp. 1-50, XP052211844, Paragraphs [7.2.1], [7.30].

(Continued)

*Primary Examiner* — Hirdepal Singh
(74) *Attorney, Agent, or Firm* — Holland & Hart LLP/ QUALCOMM Incorporated

(57)            ABSTRACT

Methods, systems, and devices for wireless communications are described. A user equipment (UE) may communicate a connection release message via a first beam to release a connection between the UE and a network entity. The UE may obtain an indication associated with a second beam of a non-terrestrial network entity indicating a set of one or more beams associated with a paging early indication. The UE may monitor for the PEI paging message based on whether the first beam is included in the set of one or more beams. Alternatively, the UE may skip monitoring for the PEI based on the first beam being excluded from the set of one or more beams, and the UE may monitor for a paging message during a paging occasion. In some examples, the UE may receive a message indicating the set of one or more beams from the non-terrestrial network entity.

31 Claims, 19 Drawing Sheets

(58) Field of Classification Search
USPC ........................................................ 455/458
See application file for complete search history.

(56)                     References Cited

U.S. PATENT DOCUMENTS

| 2023/0403679 | A1 * | 12/2023 | Zhou | ...................... | H04L 5/001 |
| 2024/0236941 | A1 * | 7/2024 | Esswie | ................. | H04W 68/02 |
| 2024/0244701 | A1 * | 7/2024 | Li | ......................... | H04W 76/28 |
| 2024/0365333 | A1 * | 10/2024 | Nagano | ................ | H04W 76/27 |
| 2024/0381317 | A1 * | 11/2024 | Hwang | .............. | H04W 68/005 |

OTHER PUBLICATIONS

International Search Report and Written Opinion—PCT/US2023/
030136—ISA/EPO—Dec. 4, 2023.
Nokia, et al., "Open Items on Paging Enhancements for UE Power
Saving", 3GPP TSG RAN WG1 #108-e, R1-2202328, 3rd Genera-
tion Partnership Project, Mobile Competence Centre, 650, Route
Des Lucioles, F-06921 Sophia-Antipolis Cedex, France, vol. RAN
WG1, No. e-Meeting, Feb. 21, 2022-Mar. 3, 2022, Feb. 14, 2022,
10 Pages, XP052110165, Paragraphs [02.1], [0004].

* cited by examiner

610

620

615

605

600

1010

1020

1015

1005

1000

130

105

115

Network
Entity

Transceiver

1310

Antenna

1315

Communications
Manager

1320

Memory

Code

1330

1325

1340

Processor

1335

1305

1300

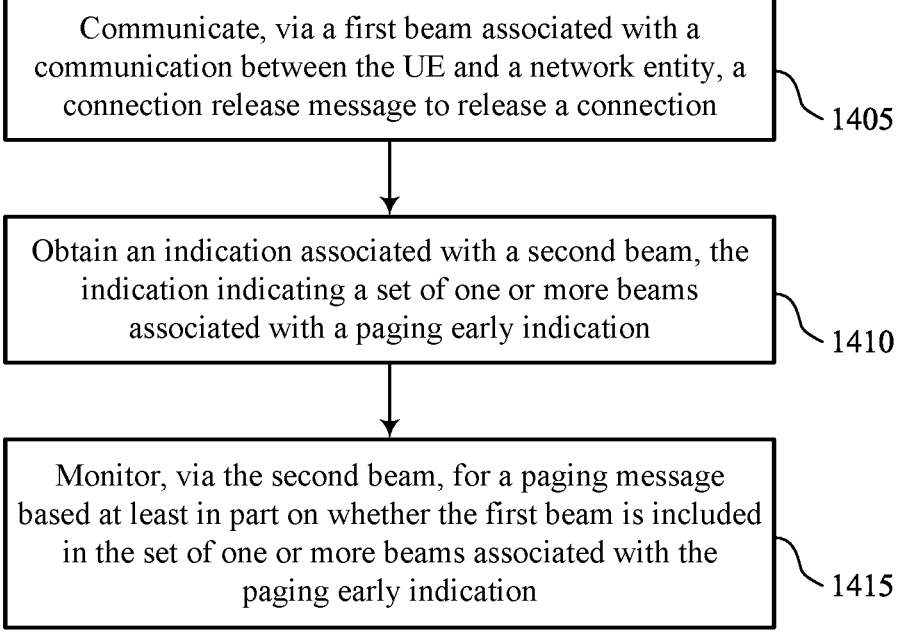

Communicate, via a first beam associated with a communication between the UE and a network entity, a connection release message to release a connection ⟩ 1405

Obtain an indication associated with a second beam, the indication indicating a set of one or more beams associated with a paging early indication ⟩ 1410

Monitor, via the second beam, for a paging message based at least in part on whether the first beam is included in the set of one or more beams associated with the paging early indication ⟩ 1415

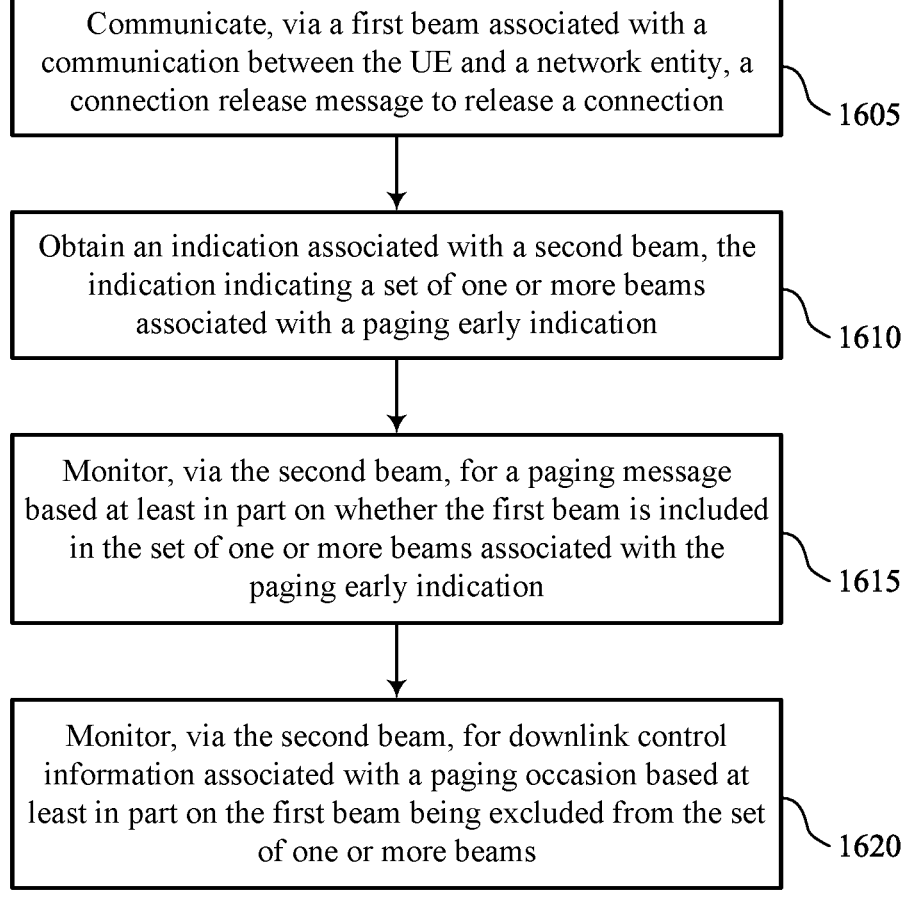

Communicate, via a first beam associated with a communication between the UE and a network entity, a connection release message to release a connection

1605

Obtain an indication associated with a second beam, the indication indicating a set of one or more beams associated with a paging early indication

1610

Monitor, via the second beam, for a paging message based at least in part on whether the first beam is included in the set of one or more beams associated with the paging early indication

1615

Monitor, via the second beam, for downlink control information associated with a paging occasion based at least in part on the first beam being excluded from the set of one or more beams

Communicate a connection release message via a first beam to release a connection associated with a UE — 1705

Determine a set of one or more beams associated with a second beam and a paging early indication — 1710

Output the paging early indication based at least in part on the set of one or more beams associated with the paging early indication — 1715

1700

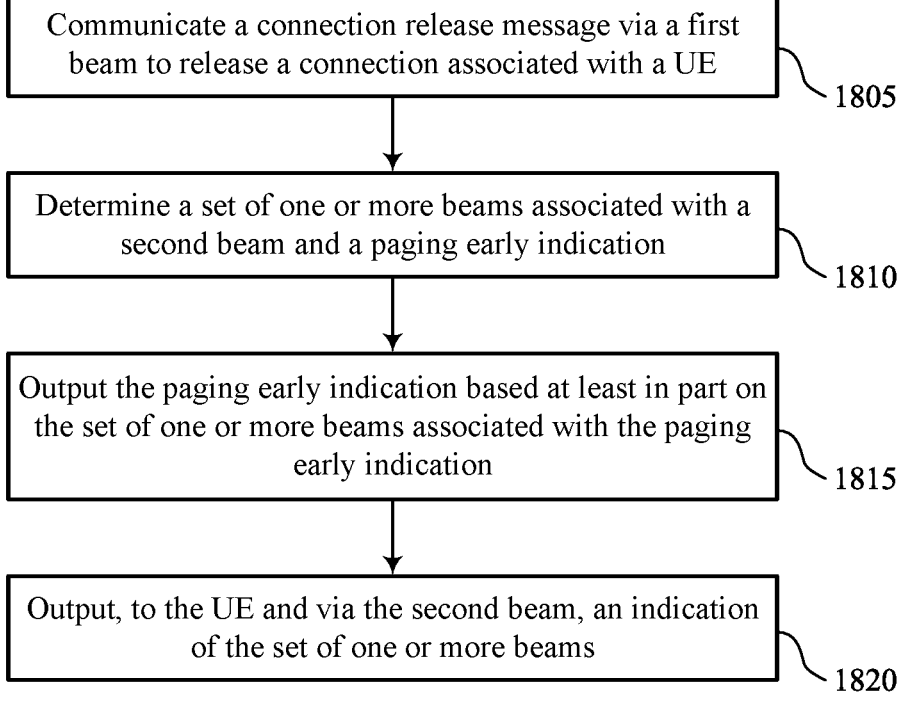

Communicate a connection release message via a first beam to release a connection associated with a UE

1805

Determine a set of one or more beams associated with a second beam and a paging early indication

1810

Output the paging early indication based at least in part on the set of one or more beams associated with the paging early indication

1815

Output, to the UE and via the second beam, an indication of the set of one or more beams

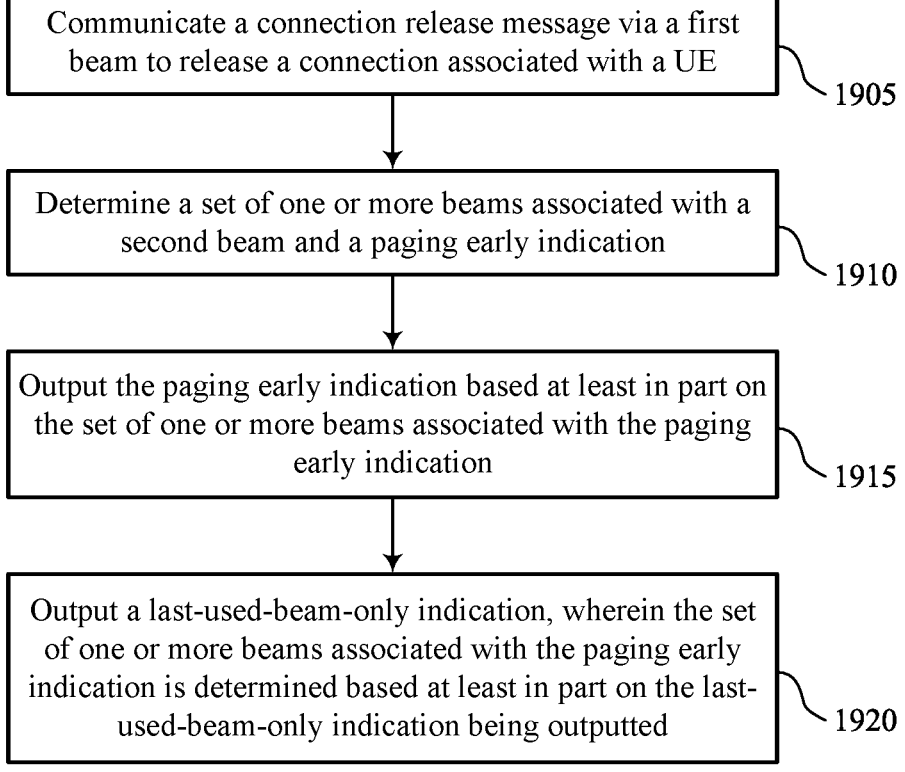

Communicate a connection release message via a first beam to release a connection associated with a UE ⎤ 1905

Determine a set of one or more beams associated with a second beam and a paging early indication ⎤ 1910

Output the paging early indication based at least in part on the set of one or more beams associated with the paging early indication ⎤ 1915

Output a last-used-beam-only indication, wherein the set of one or more beams associated with the paging early indication is determined based at least in part on the last-used-beam-only indication being outputted ⎤ 1920

PAGING EARLY INDICATIONS IN NON-TERRESTRIAL NETWORKS

INTRODUCTION

The following relates to wireless communications, including managing paging in networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

An apparatus for wireless communications at a UE is described. The apparatus may include a processor and memory coupled with the processor, the processor configured to communicate, via a first beam associated with a communication between the UE and a network entity, a connection release message to release a connection. In some examples, the processor may be configured to obtain an indication associated with a second beam, the indication indicating a set of one or more beams associated with a paging early indication (PEI). In some examples, the processor may monitor, via the second beam, for a paging message based on whether the first beam is included in the set of one or more beams associated with the PEI.

A method for wireless communications at a UE is described. The method may include communicating, via a first beam associated with a communication between the UE and a network entity, a connection release message to release a connection. In some examples, the method may include obtaining an indication associated with a second beam, the indication indicating a set of one or more beams associated with a PEI. The method may further include monitoring, via the second beam, for a paging message based on whether the first beam is included in the set of one or more beams associated with the PEI.

Another apparatus for wireless communications at a UE is described. The apparatus may include means for communicating, via a first beam associated with a communication between the UE and a network entity, a connection release message to release a connection. In some examples, the apparatus may include means for obtaining an indication associated with a second beam, the indication indicating a set of one or more beams associated with a PEI. In some examples, the apparatus may further include means for monitoring, via the second beam, for a paging message based on whether the first beam is included in the set of one or more beams associated with the PEI.

A non-transitory computer-readable medium storing code for wireless communications at a UE is described. The code may include instructions executable by a processor to communicate, via a first beam associated with a communication between the UE and a network entity, a connection release message to release a connection. In some examples, the instructions may be executable by a processor to obtain an indication associated with a second beam, the indication indicating a set of one or more beams associated with a PEI. The instructions may further be executable by a processor to monitor, via the second beam, for a paging message based on whether the first beam is included in the set of one or more beams associated with the PEI.

Some examples of the method, apparatuses, and non-transitory computer-readable medium described herein may further include operations, features, means, or instructions for monitoring, via the second beam, for the PEI based on the first beam being included in the set of one or more beams.

Some examples of the method, apparatuses, and non-transitory computer-readable medium described herein may further include operations, features, means, or instructions for monitoring, using the second beam, for downlink control information (DCI) associated with a paging occasion (PO) based on reception of the PEI.

In some examples of the method, apparatuses, and non-transitory computer-readable medium described herein, the first beam and the second beam may be the same.

Some examples of the method, apparatuses, and non-transitory computer-readable medium described herein may further include operations, features, means, or instructions for receiving, from the network entity, an indication of one or more additional beams, the one or more additional beams and the second beam having neighboring beam coverage areas, the set of one or more beams including the second beam and the one or more additional beams.

Some examples of the method, apparatuses, and non-transitory computer-readable medium described herein may further include operations, features, means, or instructions for monitoring, via the second beam, for DCI associated with a PO based on the first beam being excluded from the set of one or more beams.

Some examples of the method, apparatuses, and non-transitory computer-readable medium described herein may further include operations, features, means, or instructions for receiving, from the network entity, a last-used-beam-only indication, where the indication associated with the second beam may be obtained based on the last-used-beam-only indication.

Some examples of the method, apparatuses, and non-transitory computer-readable medium described herein may further include operations, features, means, or instructions for storing an indication of the first beam associated with a most recent communication between the UE and the network entity, where the paging message may be monitored based on the stored indication of the first beam.

In some examples of the method, apparatuses, and non-transitory computer-readable medium described herein, the first beam may be associated with a most recent communication between the UE and the network entity.

Some examples of the method, apparatuses, and non-transitory computer-readable medium described herein may further include operations, features, means, or instructions for receiving, from a network entity and via the second beam, a system information block (SIB) indicating the set of one or more beams associated with the PEI.

Some examples of the method, apparatuses, and non-transitory computer-readable medium described herein may further include operations, features, means, or instructions for selecting a third beam as a camping beam of the UE used to monitor one or more channels associated with the network entity and receiving, from a network entity and via the third beam, an SIB indicating a second set of one or more beams associated with the PEI.

An apparatus for wireless communications at a network entity is described. The apparatus may include a processor and memory coupled with the processor. The processor may be configured to communicate a connection release message via a first beam to release a connection associated with a UE. In some examples, the processor may determine a set of one or more beams associated with a second beam and a PEI, and output the PEI based on the set of one or more beams associated with the PEI.

A method for wireless communications at a network entity is described. The method may include communicating a connection release message via a first beam to release a connection associated with a UE. In some examples, the method may include determining a set of one or more beams associated with a second beam and a PEI, and outputting the PEI based on the set of one or more beams associated with the PEI.

Another apparatus for wireless communications at a network entity is described. The apparatus may include means for communicating a connection release message via a first beam to release a connection associated with a UE. In some examples, the apparatus may include means for means for determining a set of one or more beams associated with a second beam and a PEI, and means for outputting the PEI based on the set of one or more beams associated with the PEI.

A non-transitory computer-readable medium storing code for wireless communications at a network entity is described. The code may include instructions executable by a processor to communicate a connection release message via a first beam to release a connection associated with a UE. In some examples, the code may include instructions executable by a processor to determine a set of one or more beams associated with a second beam and a PEI, and output the PEI based on the set of one or more beams associated with the PEI.

Some examples of the method, apparatuses, and non-transitory computer-readable medium described herein may further include operations, features, means, or instructions for outputting, to the UE and via the second beam, an indication of the set of one or more beams.

In some examples of the method, apparatuses, and non-transitory computer-readable medium described herein, outputting the indication of the set of one or more beams may include operations, features, means, or instructions for outputting an SIB that indicates the set of one or more beams associated with the PEI.

Some examples of the method, apparatuses, and non-transitory computer-readable medium described herein may further include operations, features, means, or instructions for outputting a last-used-beam-only indication, where the set of one or more beams associated with the PEI may be determined based on the last-used-beam-only indication being outputted.

Some examples of the method, apparatuses, and non-transitory computer-readable medium described herein may further include operations, features, means, or instructions for outputting, using the second beam, the PEI based on the first beam being included in the set of one or more beams associated with the PEI.

Some examples of the method, apparatuses, and non-transitory computer-readable medium described herein may further include operations, features, means, or instructions for outputting an indication of one or more additional beams, the one or more additional beams and the second beam having neighboring beam coverage areas, where the set of one or more beams includes the second beam and the one or more additional beams.

In some examples of the method, apparatuses, and non-transitory computer-readable medium described herein, the first beam and the second beam may be the same.

In some examples of the method, apparatuses, and non-transitory computer-readable medium described herein, the first beam may be associated with a most recent transmission between the UE and the network entity.

Some examples of the method, apparatuses, and non-transitory computer-readable medium described herein may further include operations, features, means, or instructions for storing an indication of the first beam, where the PEI may be outputted based on storing the indication of the first beam.

Some examples of the method, apparatuses, and non-transitory computer-readable medium described herein may further include operations, features, means, or instructions for outputting a control message during a PO based on outputting the PEI.

BRIEF DESCRIPTION OF THE DRAWINGS

FIGS. 14 through 19 show flowcharts illustrating methods that support PEIs in NTNs in accordance with one or more aspects of the present disclosure.

DETAILED DESCRIPTION

Figure 1:
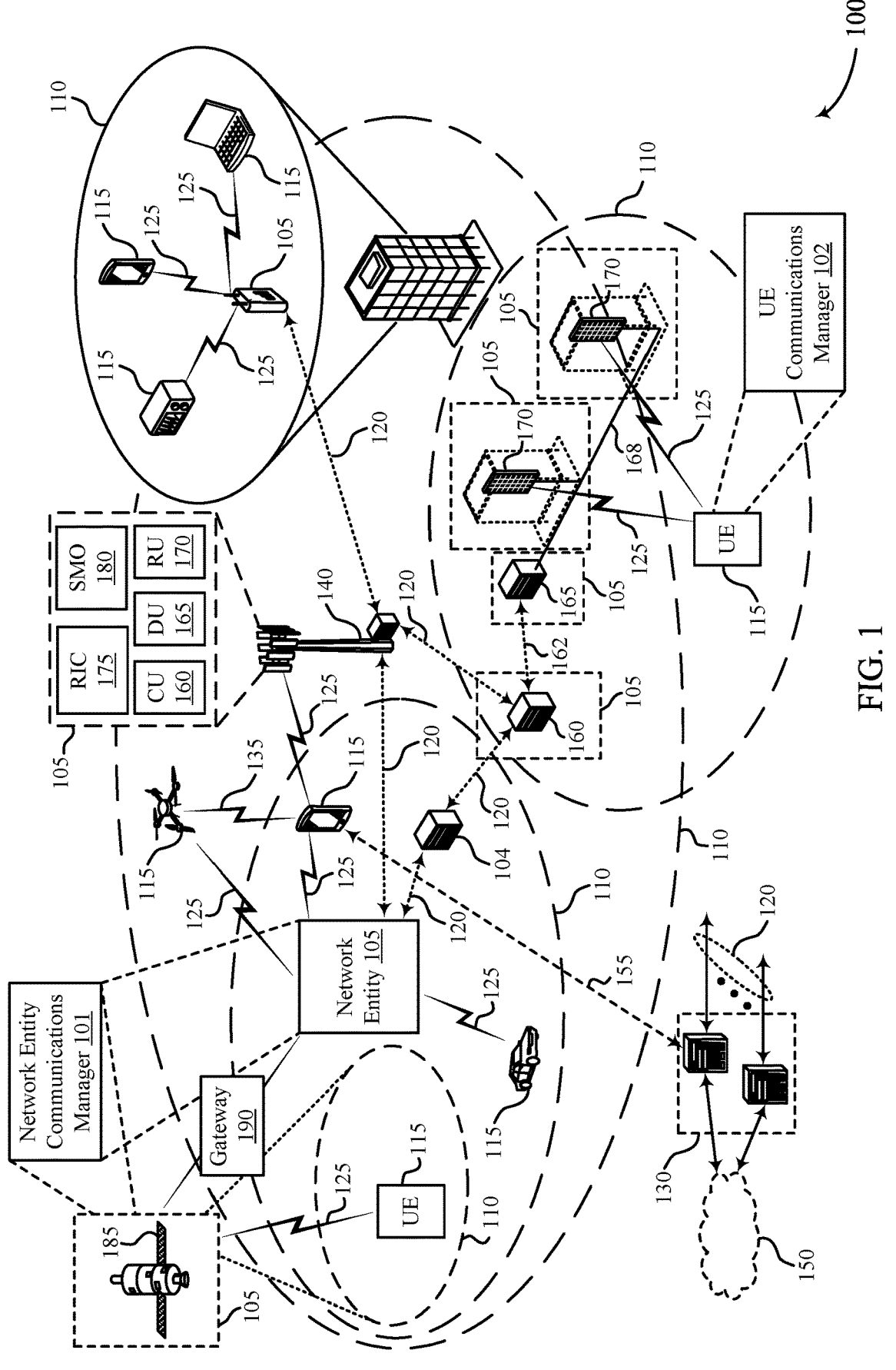
FIG. 1 illustrates an example of a wireless communications system that supports PEIs in non-terrestrial networks (NTNs) in accordance with one or more aspects of the present disclosure.

A network entity may transmit a PEI to a UE to indicate the UE to monitor an upcoming PO. In some examples, the network entity may transmit a PEI to multiple UEs belonging to a same paging subgroup. For example, the network entity may broadcast the PEI in beams corresponding to a cell of the network entity. A UE may detect a PEI that indicates the paging subgroup to which the UE belongs and determine to monitor the upcoming PO. Alternatively, if the UE does not detect a PEI, the UE may skip monitoring of the upcoming PO. In some examples, the network entity may broadcast an indication (e.g., a lastUsedCellOnly indication) to UEs within the cell to indicate that the UEs should monitor for PEIs only if a last connection of the UEs was released by the cell. As such, if the last connection of a UE was released by a different cell, the UE may monitor for an upcoming PO even if the UE did not detect a PEI.

In some cases, due to a non-terrestrial network entity having a large cell footprint, transmitting a PEI to a paging subgroup of UEs using each beam corresponding to a cell may result in unnecessary signaling overhead and power consumption at the non-terrestrial network entity. Further, the quantity of UEs in one paging subgroup may be large as the quantity of UEs served by one cell may be higher for a non-terrestrial network entity than for a terrestrial network entity due to the larger cell footprint. As such, each time a UE in the paging subgroup is paged (e.g., is scheduled to receive paging DCI), each of the other UEs in the paging subgroup may detect the PEI and determine to monitor a respective PO, even when there is no paging DCI available for the other UEs. This may result in a false alarm issue at the other UEs, which may cause increased power consumption at the other UEs.

Accordingly, techniques, systems, and devices described herein enable a UE to determine a set of beams associated with a non-terrestrial network and determine whether to monitor for a PEI based on the set of beams and a last used beam (e.g., a beam associated with a most recent communication for which a last connection was released), in accordance with aspects of the present disclosure. For example, a UE may transmit to a network entity or receive from a network entity a connection release message to release a cell to which the UE is connected. The connection release message may indicate to the UE to operate in an idle or inactive mode and may be transmitted or received via a control channel.

The set of beams may correspond to a subset of beams available in a cell. For example, the set of beams may include a first beam and, in some cases, one or more neighboring beams to the first beam. For example, the UE may determine that the last used beam of the UE is contained within the set of beams and monitor for the PEI via a camping beam (e.g., a beam of the network entity 105 that the UE 115 is camped on). Alternatively, the UE may determine that the last used beam of the UE is excluded from the set of beams and determine to skip monitoring for the PEI and, in some examples, monitor a PO associated with the UE using the camping beam. As such, the network entity may consider PEI transmissions for a subset of beams of the beams available in a cell (e.g., the first beam and, in some cases, the one or more neighboring beams), which may reduce transmission overhead and power consumption at the network entity. Further, the paging subgroups of UEs may be smaller in size, as they may correspond to UEs operating within the set of beams (e.g., instead of all beams available in the cell), and the false alarm frequency may be reduced, therefore reducing power consumption at UEs.

Aspects of the disclosure are initially described in the context of wireless communications systems. Aspects of the disclosure are additionally illustrated with reference to process flows. Aspects of the disclosure are further illustrated by and described with reference to apparatus diagrams, system diagrams, and flowcharts that relate to PEIs in NTNs.

FIG. 1 illustrates an example of a wireless communications system 100 that supports PEIs in NTNs in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support PEIs in NTNs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may camp at a cell of a network entity 105. For example, the UE 115 may have selected a cell (e.g., after completing a cell selection process) and may monitor system information (e.g., an SIB) and paging information associated with the cell. In some examples, the UE 115 may select a camping beam (e.g., a beam of the cell that the UE 115 is camped on), and the UE 115 may monitor the camping beam for transmissions or broadcasts from the cell (e.g., system information or paging information). In some cases, the camping beam may be a best beam (e.g., a beam with a highest signal strength), which may be a synchronization signal block (SSB) beam or a physical broadcast channel beam.

A network entity communications manager 101 may manage communications between a network entity 105 and other devices in the wireless communications system 100. In a similar manner, a UE communications manager 102 may manage communications between a UE 115 and other devices in the wireless communications system 100. As described herein, a network entity 105 may refer to a terrestrial communication device (such as a base station 140) or a non-terrestrial communication device (such as a satellite 185, a balloon, a drone, or another non-terrestrial device). A non-terrestrial network entity 105 may be connected to a terrestrial network entity 105 via a gateway 190. In some examples, a non-terrestrial network entity 105 may correspond to a first cell type (e.g., an NTN cell type), and a terrestrial network entity 105 may correspond to a second cell type (e.g., a terrestrial (TN) cell type) different from the first cell type.

An non-terrestrial network entity 105 may provide coverage to areas in which a terrestrial network entity 105 may not be available. A channel corresponding to the non-terrestrial network entity 105 may be characterized with strong line of sight conditions, as a signal provided by the non-terrestrial network entity 105 may be reflected at the sky (e.g., as opposed to a signal corresponding to a terrestrial network entity 105 which may travel over a ground surface). A footprint of a beam radiated from the non-terrestrial network entity 105 may have a relatively clear boundary (e.g., as compared to terrestrial network entity 105 beam boundaries), and a UE 115 may be likely to operate within a single beam serving area (e.g., except in cases where a UE 115 is located at the boundary between two serving areas). In some examples, a serving area for a beam corresponding to the non-terrestrial network entity 105 may be larger than a serving area for a beam corresponding to a terrestrial network entity 105.

A network entity 105 may transmit a PEI to a UE 115 to indicate the UE 115 to monitor an upcoming PO. In some examples, the network entity 105 may transmit a PEI to multiple UEs 115 belonging to a same paging subgroup. For example, the network entity 105 may broadcast the PEI in beams corresponding to a cell. A UE 115 may detect a PEI that indicates the paging subgroup that the UE 115 belongs to and determine to monitor the upcoming PO. Alternatively, if the UE 115 does not detect a PEI, the UE 115 may determine to skip monitoring of the upcoming PO. In some examples, the network entity 105 may broadcast an indication (e.g., a lastUsedCellOnly indication) to UEs 115 within the cell to indicate that the UEs 115 should monitor for PEIs only if a last connection of the UEs 115 was released by the cell. As such, if the last connection of a UE 115 was released by a different cell, the UE 115 may monitor for an upcoming PO even if the UE 115 did not detect a PEI.

In some cases, due to a non-terrestrial network entity 105 having a large cell footprint that may be associated with multiple beams, transmitting a PEI to a paging subgroup of UEs 115 using each beam corresponding to a cell may result in unnecessary signaling overhead and power consumption at the non-terrestrial network entity 105. Further, the quantity of UEs 115 in one paging subgroup may be large as the quantity of UEs 115 served by one cell of the non-terrestrial network entity 105 may be higher than for a cell of a terrestrial network entity 105 due to the larger cell footprint.

As such, each time a UE 115 in the paging subgroup is paged (e.g., is scheduled to receive paging DCI), each of the other UEs 115 in the paging subgroup may detect the PEI and determine to monitor a respective PO, even when there is no paging DCI available for the other UEs 115. This may result in a false alarm problem at the other UEs 115 of the large paging subgroup, which may cause increased power consumption at multiple UEs 115.

Accordingly, techniques, systems, and devices described herein provide for a UE 115 to determine a set of beams associated with a cell and determine whether to monitor for a PEI based on the set of beams and a last used beam (e.g., a last used camping beam for which a last connection was released). The set of beams may correspond to a subset of all beams available in a cell. For example, the set of beams may include a first beam (e.g., a camping beam) and, in some cases, one or more neighboring beams to the first beam. For example, the UE 115 may determine that the last used beam of the UE 115 is contained within the set of beams and monitor for the PEI via a camping beam (e.g., a beam of the network entity 105 that the UE 115 is camped on). Alternatively, the UE 115 may determine that the last used beam of the UE 115 is excluded from the set of beams and determine to skip monitoring for the PEI and, in some examples, monitor a PO associated with the UE 115 using the camping beam. As such, the network entity 105 may consider PEI transmissions for the subset of beams (e.g., the first beam and, in some cases, the one or more neighboring beams) of all the beams available in the cell, which may reduce transmission overhead and power consumption at the network entity 105. Further, the paging subgroups of UEs 115 may be smaller in size, as they may correspond to UEs 115 operating within the set of beams (e.g., instead of UEs 115 operating within all beams available in the cell), which may reduce the false alarm frequency at other UEs 115 and reducing power consumption at the UEs 115.

Figure 2:
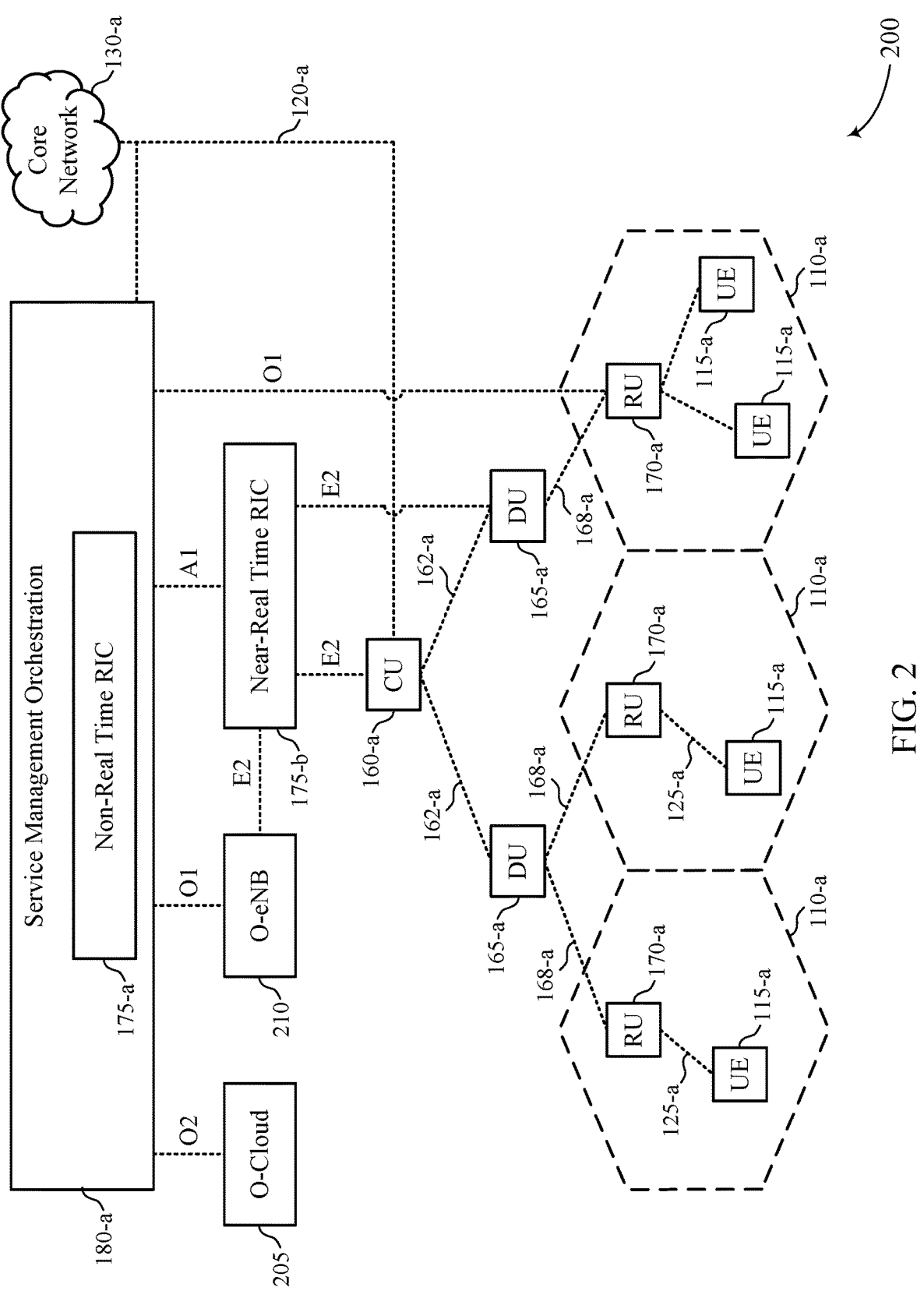
FIG. 2 illustrates an example of a network architecture that supports PEIs in NTNs in accordance with one or more aspects of the present disclosure.

FIG. 2 illustrates an example of a network architecture 200 (e.g., a disaggregated base station architecture, a disaggregated RAN architecture) that supports PEIs in NTNs in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support PEIs by a non-terrestrial network entity. For example, any combination of the network entities included in the network architecture 200 may support a non-terrestrial network entity, a terrestrial network entity, or a combination thereof. A non-terrestrial network entity may include an RU 170-*a*, a DU 165-*a*, a CU 160-*a*, or any combination thereof (e.g., as components or otherwise connected or in communication with a satellite 185 or other non-terrestrial network entity).

A UE 115 may determine a set of beams associated with a cell and determine whether to monitor for a PEI based on the set of beams and a last used beam for communications with a cell of a non-terrestrial network entity (e.g., a beam associated with a most recent communication for which a last connection was released). The set of beams may correspond to a subset of beams available in a cell of a non-terrestrial network entity. For example, the set of beams may include a first beam and, in some cases, one or more neighboring beams to the first beam. In some examples, the UE 115 may receive an indication of the set of beams from the non-terrestrial network entity 105.

The UE 115 may determine that the last used beam of the UE 115 is contained within the set of beams and monitor for the PEI using the camping beam. Alternatively, the UE 115 may determine that the last used beam of the UE 115 is excluded from the set of beams and determine to skip monitoring for the PEI and, in some examples, monitor a PO associated with the UE 115 using the camping beam. As such, the non-terrestrial network entity may consider PEI transmissions for a subset of beams of all the beams available in the cell, which may reduce transmission overhead and power consumption at the network entity.

Figure 3:
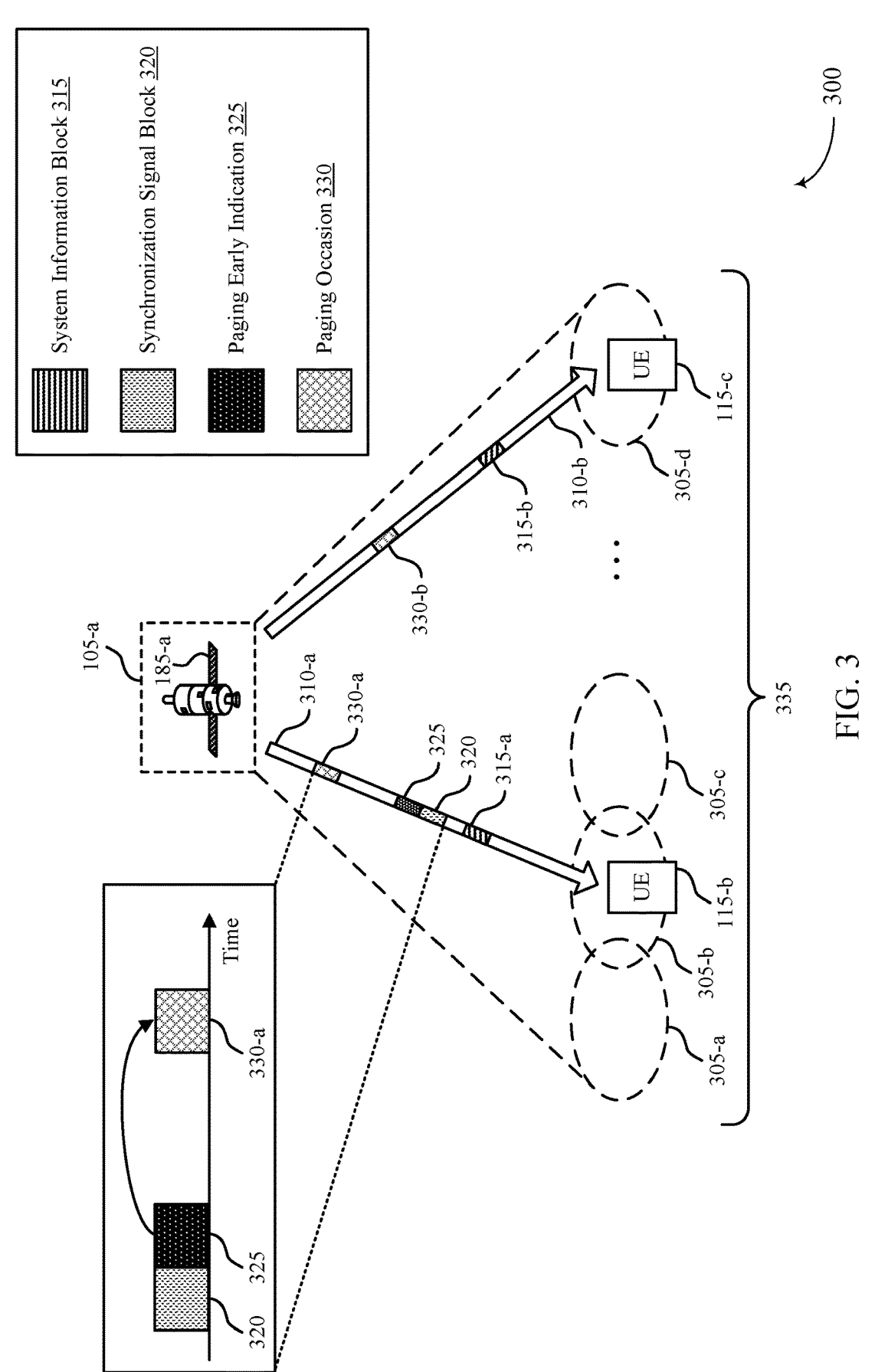
FIG. 3 illustrates an example of a wireless communications system that supports PEIs in NTNs in accordance with one or more aspects of the present disclosure.

FIG. 3 illustrates an example of a wireless communications system 300 that supports PEIs in NTNs in accordance with one or more aspects of the present disclosure. The wireless communications system 300 may be an example of a wireless communications system 100 as described herein with reference to FIG. 1. In some examples, the wireless communications system 300 may include a network architecture 200 as described with reference to FIG. 2. The wireless communications system 300 may include a UE 115-*b* and a UE 115-*c*, which may be examples of UEs 115 as described with reference to FIGS. 1 and 2, and a network entity 105-*a*, which may be an example of network entities 105 as described with reference to FIGS. 1 and 2. In some cases, the network entity 105-*a* may be an example of a non-terrestrial network entity 105-*a*, such as a satellite 185-*a*.

The network entity 105-*a* may support multiple beam coverage areas 305 in a cell 335, such as beam coverage areas 305-*a*, 305-*b*, 305-*c*, and 305-*d* associated with a beams 340-*a*, 340-*b*, 340-*c*, and 340-*d*, respectively. The beam coverage areas may be associated with a communication link 310 for communications with a UE 115, such as communication link 310-*a* and communication link 310-*b*, which may be examples of communication links 125 as described herein, with reference to FIG. 1. In some examples, the beam coverage areas 305 may be larger than a beam coverage area 305 corresponding to a terrestrial network entity 105. As such, a UE 115 may be more likely to operate within a single beam coverage area 305. For example, UE 115-*b* may operate within beam coverage area 305-*b*, and UE 115-*c* may operate within beam coverage area 305-*d*. In some examples, as a beam coverage area 305 of the network entity 105-*a* may be large, a camping beam 340 selected by the UE 115-*b* for communications with the cell of the network entity 105-*a* may be more likely to be the same as a last used beam 340 (e.g., a last used camping beam 340) associated with a most recent communication for which a last connection was released (e.g., suspended) by the UE 115-*b* or the cell of the network entity 105-*a*.

The network entity 105-*a* may transmit an SIB 315 containing information about the cell 335 via beams 340 associated with each beam coverage area 305. For example, the network entity 105-*a* may transmit an SIB 315-*a* to UE 115-*b* via a beam 340-*b* associated with beam coverage area 305-*b* and an SIB 315-*b* to UE 115-*c* via a beam 340-*d* associated with beam coverage area 305-*d*. In some examples, the information contained within each SIB 315 associated with the cell 335 may be the same. Alternatively, the information contained within each SIB 315 may be different for each beam 340 of the cell 335. In some cases, if a UE 115 may switch to another beam 340 (e.g., reselect a camping beam 340) of the cell 335, the UE 115 may read an SIB 315 corresponding to the beam 340 the UE 115 switched to. For example, if the UE 115-*b* moves to beam coverage area 305-*c*, the UE 115-*b* may reselect a camping beam 340-*c* and re-read an SIB 315 associated with the camping beam 340-*c* associated with beam coverage area 305-*c*.

In some examples, the network entity 105-*a* may transmit a PEI 325 (e.g., following an SSB 320) indicating a paging subgroup. A UE 115 may detect the PEI 325 indicating the paging subgroup that may be associated with the UE 115, and the UE 115 may monitor (e.g., process) an upcoming PO 330. For example, if the UE 115-*b* detects a PEI 325 corresponding to a paging subgroup of the UE 115-*b*, the UE 115-*b* may monitor an upcoming PO 330-*a* using a camping beam 340-*b* (e.g., a beam 340-*b* of the network entity 105-*a* that the UE 115-*b* is camped on). In a further example, if the UE 115-*b* does not detect a PEI 325, the UE 115-*b* may skip monitoring of an upcoming PO 330-*a*. In some cases, the network entity 105-*a* may transmit an indication (e.g., in system information such as an SIB 315) that UEs 115 should monitor PEI in a last used cell (e.g., a lastUsedCellOnly indication). For example, if the network entity 105-*a* broadcasts the lastUsedCellOnly indication, UE 115-*b* may monitor for a PEI 325 if a last connection was released within cell 335. Alternatively, if a last connection of the UE 115-*b* was released by a different cell other than cell 335, the network entity 105-*a* may not transmit PEI 325 for the UE 115-*b* in cell 335, and the UE 115-*b* may monitor for a PO 330 even if the UE 115-*b* did not detect a PEI 325.

In accordance with examples described herein, a UE 115 may determine a set of one or more beams 345 associated with monitoring for PEI 325. In some examples, the network entity 105-*a* may determine the set of one or more beams 345 and transmit an indication of the set to UE 115-*b* (e.g., in the SIB 315-*a*) via a camping beam 345-*b*. For example, if the UE 115-*b* moves to a new beam coverage area 305-*c* and reselects a camping beam 340-*c*, the UE 115-*b* may receive another indication (e.g., in another SIB 315) corresponding to a set of one or more beams 345 for the reselected camping beam 340-*c*. Additionally, or alternatively, the UE 115-*b* may autonomously determine the set of one or more beams 345 associated with a cell of the new beam coverage area 305-*c*. In some examples, the set of one or more beams 345 may include the current camping beam 340 and, in some cases, one or more neighboring beams (e.g., beams with consecutive beam indices and/or beams with neighboring/overlapping beam footprint areas on the ground) to the current camping beam. For example, the set of one or more beams 345 associated with UE 115-*b* may include the camping beam 340-*b* with a beam index M and, in some cases, a neighboring beam 340-*a* with beam index M−1 (e.g., corresponding to beam coverage area 305-*a*) and a neighboring beam 340-*c* with beam index M+1 (e.g., corresponding to beam coverage area 305-*c*). In a further example, a set of one or more beams 345 associated with UE 115-*c* may include the camping beam 340-*d* with a beam index M and, in some cases, a neighboring beam 340 (not shown) with beam index M−1. In a further example, the set of one or more beams 345 associated with UE 115-*c* may further include a neighboring beam from a neighboring cell, e.g., a cell different from cell 335 and served by either the same network entity 105-*a* or a different network entity.

The UE 115-*b* may monitor for PEI 325 based on the set of one or more beams 345. For example, the UE 115-*b* may determine to monitor for PEI 325 based on whether a last used beam 340 (e.g., a beam 340 for which a last connection of the UE 115-*b* was released or suspended) of the UE 115-*b* is contained in the set of one or more beams 345. That is, the UE 115-*b* may determine that the last used beam 340 of the UE 115-*b* is contained within the set of one or more beams 345 and monitor for a PEI 325. If the UE 115-*b* detects the PEI 325, the UE 115-*b* may monitor for a PO 330 via the camping beam 340-*b*. Alternatively, the UE 115-*b* may determine that the last used beam 340 of the UE 115-*b* is excluded from the set of one or more beams 345 (e.g., if the UE 115-*b* moved to or from another beam coverage area 305) and skip monitoring for PEI 325. In this case, the UE 115-*b* may monitor for a PO 330 via the camping beam 340-*b* (e.g., without detecting a PEI 325).

Accordingly, the network entity 105-*a* may transmit PEIs 325 to the UE 115-*b* if the last used beam 340 of the UE 115-*b* is included within the set of one or more beams 345 associated with the UE 115-*b*. As such, the network entity 105-*a* may consider a smaller subset of UEs 115 for transmitting PEI 325 in each beam 340 associated with a beam coverage area 305 of a cell 335. For example, a paging subgroup associated with a PEI 325 may be reduced to contain UEs 115 operating within a set of one or more beams 345 (e.g., a beam 340 associated with a beam coverage area 305 and, in some cases, one or more neighboring beams 340). Therefore, the quantity of PEI 325 transmissions may be reduced, thereby reducing overhead and power consumption at the network entity 105-*a*. Further, as the paging subgroups for the network entity 105-*a* may be smaller in size relative to a TN network entity 105, the frequency of false alarms at UEs 115 (e.g., UEs 115 receiving a PEI 325 intended for another UE 115 in the same paging subgroup) may be reduced, thereby reducing power consumption at the UEs 115.

In some examples, the network entity 105-*a* may store last used beam 340 information corresponding to a UE 115. For example, the network entity 105-*a* may store a last used beam 340 of the UE 115-*b* after a connection with the UE 115-*b* is released or suspended. In some implementations, the network entity 105-*a* may transmit a message to a core network (CN) indicating the CN of last used beam 340 information of the UE 115 (e.g., after a connection with a UE 115 is released or suspended). If a paging message addressed to a UE 115 is to be transmitted, the CN may transmit last used beam 340 information corresponding to the UE 115 to the network entity 105-*a*. Accordingly, the network entity 105-*a* may determine one or more beams 340 to transmit a PEI 325 based on the stored last used beam 340 information if the network entity 105-*a* determines that a paging message addressed to the UE 115 (e.g., a paging message for an RRC_INACITVE or an RRC_IDLE UE 115) is to be transmitted in a PO 330.

In some examples, the aspects described herein relating to a set of one or more beams 345 associated with PEI 325 transmissions may be activated or applied for a network entity 105-*a* based on certain scenarios or deployments. For example, the aspects may be enabled if the network entity 105-*a* is a geostationary earth orbiting (GEO) or a medium earth orbit (MEO) satellite 185 with a serving time for a considered area being larger than a threshold time. Similarly, the quantity of beams 340 to include in a set of one or more beams 345 associated with PEI 325 transmissions may be based on the satellite 185 type or the deployment scenario. For example, in the case of a fast earth-moving cell 335 (e.g., a cell 335 with a beam coverage area 305 that moves along the ground as the network entity 105-*a* moves), the set of one or more beams 345 may include a larger quantity of beams 340. As such, more UEs 115 camped on a beam 340 of the cell 335 may apply PEI 325 procedures to improve power saving.

In some cases, the network entity 105-*a* may change the quantity of beams 340 in a set of one or more beams 345 based on one or more of a real-time traffic in a considered beam 340, and a quantity of UEs 115 that have had a connection released in a beam 340 (e.g., a beam 340 to be indicated in the set of one or more beams 345). For example, if the network entity 105-*a* determines that the traffic load in the considered beam 340 is low, the network entity 105-*a* may increase the quantity of beams 340 contained in the set of one or more beams 345 (e.g., to include one or more neighboring beams 340) corresponding to the considered beam 340. As such, more UEs 115 camped in the considered beam may apply PEI 325 procedure to reduce power consumption.

Figure 4:
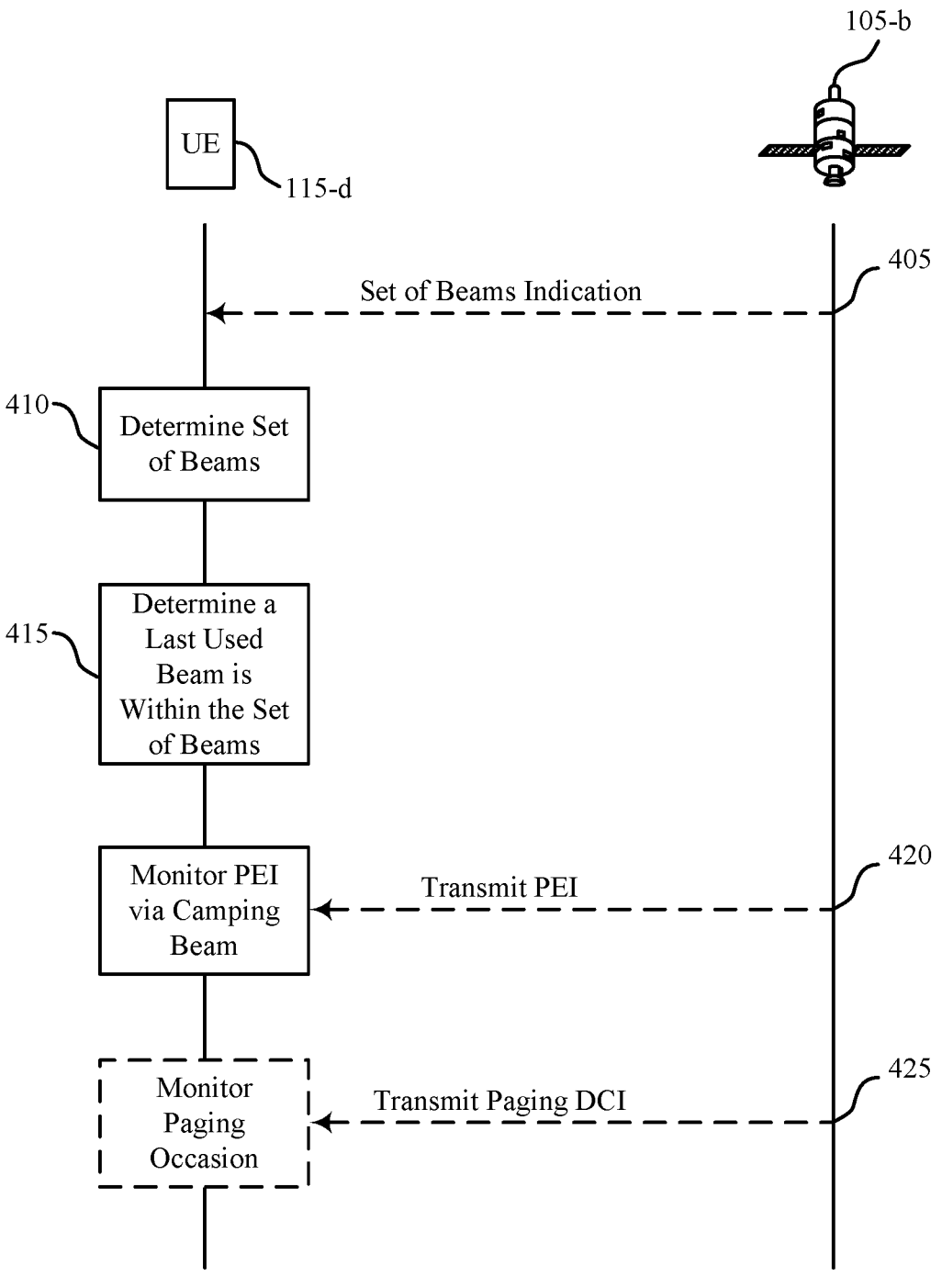
FIG. 4 illustrates an example of a process flow that supports PEIs in NTNs in accordance with one or more aspects of the present disclosure.

FIG. 4 illustrates an example of a process flow 400 that supports PEIs in NTNs in accordance with one or more aspects of the present disclosure. The process flow 400 may be implemented in a wireless communications system 100 or a wireless communications system 300 as described herein with reference to FIGS. 1 and 3. The process flow 400 may include a UE 115-*d*, which may be an example of a UE 115 as described with reference to FIGS. 1 through 3, and may include a network entity 105-*b*, which may be examples of network entities 105 as described with reference to FIGS. 1 through 3. In the following description of the process flow 400, the operations performed by the devices may be performed in different orders or at different times. Additionally, or alternatively, some operations may be omitted from the process flow 400, and other operations may be added to the process flow 400.

At 405, the network entity 105-*b* may transmit a message containing an indication of a set of beams (e.g., beam indices) associated with PEI monitoring to the UE 115-*d*. For example, the network entity 105-*b* may transmit the indication of the set of beams in an SIB (e.g., an NTN-specific SIB). In some examples, the indication of the set of beams may include a set of one or more SSB beams, indices corresponding to the set of one or more SSB beams, or both. In some cases, the network entity 105-*b* may transmit a message (e.g., an SIB) containing a last-used-beam-only indication. The last-used-beam-only indication may indicate the UE 115-*d* to monitor for PEIs using a camping beam (e.g., a beam of the network entity 105-*b* that the UE 115-*d* is camped on), if the camping beam of UE 115-*d* is the beam where the last connection of UE 115-*d* was released, i.e., the camping beam is the last used beam of UE 115-*d*.

At 410, the UE 115-*d* may determine a set of beams associated with PEI monitoring. For example, the UE 115-*d* may obtain an indication associated with a camping beam (e.g., a beam of the network entity 105-*b* that the UE 115-*d* is camped on) that indicates the set of beams associated with PEI monitoring. In some cases, the UE 115-*d* may obtain the indication associated with the camping beam the set of beams based on the message received from the network entity 105-*b* containing the indication. Alternatively, the UE 115-*d* may autonomously determine an indication of the set of beams. For example, the network entity 105-*b* may have transmitted previous signaling to the UE 115-*d* indicating information about beams of the network entity 105-*b* (e.g., a set of SSB beams and corresponding indices), which may assist the UE 115-*d* in determining neighbor beams to the current camping beam. The set of beams may be the camping beam, and, in some cases, the set of beams may additionally include one or more neighboring beams (e.g., beams with consecutive beam indices) to the camping beam. In some examples, the UE 115-*d* may determine the set of beams based on a previous signaling form the network entity 105-*b*, technical specifications (e.g., pre-configured specifications), or a combination thereof.

At 415, the UE 115-*d* may determine that the last used beam of the UE 115-*d* is included within the set of beams. For example, the UE 115-*d* may determine the last used beam of the UE 115-*d* is included within the set of beams based on the index of the last used beam. In some examples, the UE **115-*d* may store last used beam information after a connection release, and the UE 115-*d* may read the stored information to determine whether the last used beam is contained within the set of beams. The UE 115-*d* may determine to monitor for PEI via the camping beam based on the last used beam of the UE 115-*d*** being included within the set of beams.

At 420, the UE **115-*d* may monitor for a paging message (e.g., the PEI) via the camping beam based on the last used beam of the UE 115-*d* being included in the set of beams. The network entity 105-*b* may transmit the PEI, which may indicate a paging subgroup. For example, the network entity 105-*b* may determine that a paging message is to be transmitted to UE 115-*d*, and that the last used beam of the UE 115-*d* is contained in the set of beams. The network entity 105-*b* may then transmit the PEI indicating the paging subgroup corresponding to the UE 115-*d*** via the camping beam.

At 425, the network entity **105-*b* may transmit a paging message during a PO of the UE 115-*d*. The UE 115-*d*** may monitor the PO for the paging message, for example, based on receiving the PEI.

Figure 5:
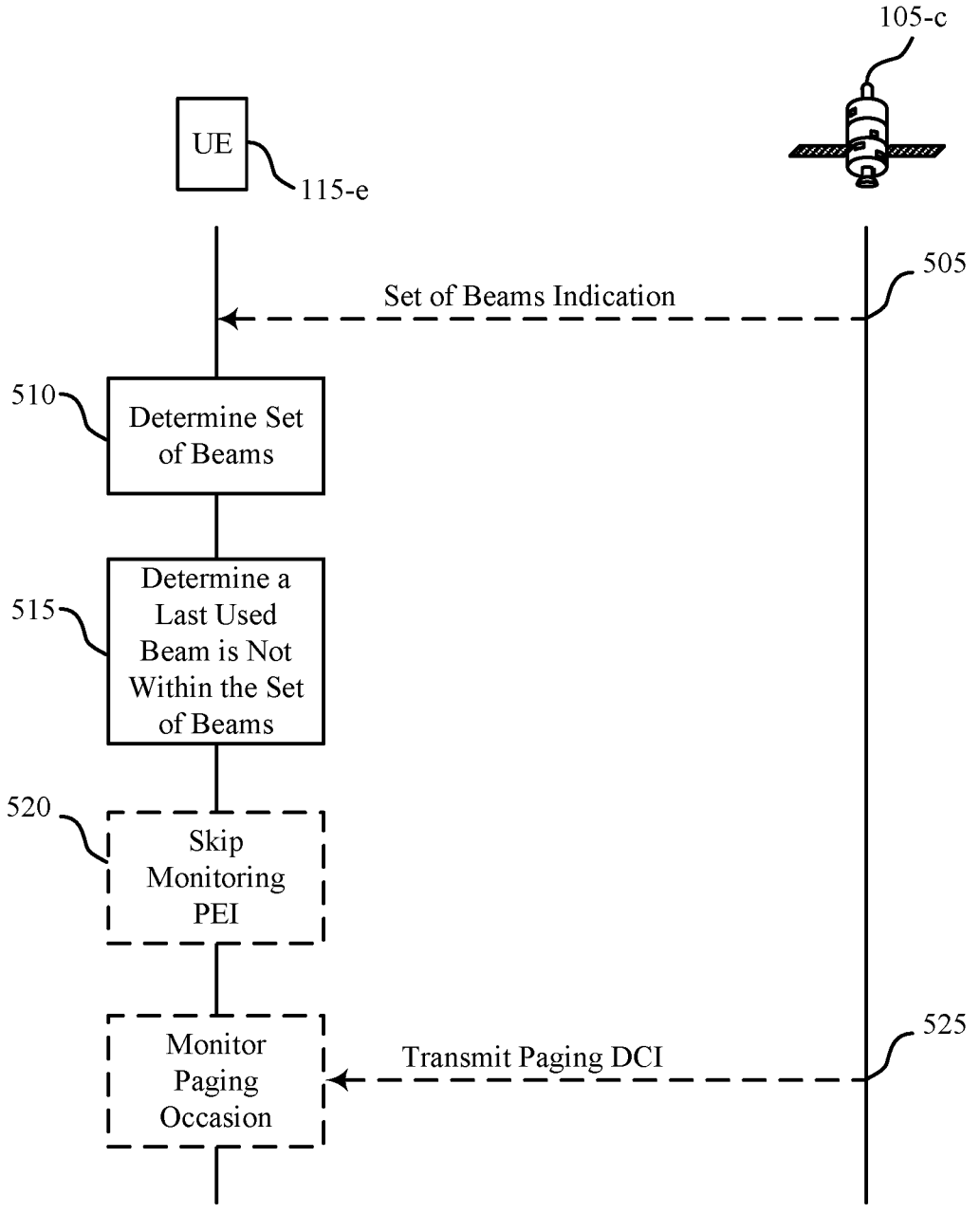
FIG. 5 illustrates an example of a process flow that supports PEIs in NTNs in accordance with one or more aspects of the present disclosure.

FIG. 5 illustrates an example of a process flow 500 that supports PEIs in NTNs in accordance with one or more aspects of the present disclosure. The process flow 500 may be implemented in a wireless communications system 100 or a wireless communications system 300 as described with reference to FIGS. 1 and 3. The process flow 500 may include a UE **115-*e*, which may be an example of a UE 115 as described with reference to FIGS. 1 through 4, and may include a first network entity 105-*c*, which may be examples of network entities 105 as described with reference to FIGS. 1 through 4. In the following description of the process flow 500, the operations performed by the devices may be performed in different orders or at different times. Additionally, or alternatively, some operations may be omitted from the process flow 500, and other operations may be added to the process flow 500**.

At 505, the network entity **105-*c* may transmit a message containing an indication of a set of beams (e.g., beam indices) associated with PEI monitoring to the UE 115-*e*. For example, the network entity 105-*c* may transmit the indication of the set of beams in an SIB (e.g., an NTN-specific SIB). In some examples, the indication of the set of beams may include a set of one or more SSB beams, indices corresponding to the set of one or more SSB beams, or both. In some cases, the network entity 105-*c* may transmit a message (e.g., an SIB) containing a last-used-beam-only indication. The last-used-beam-only indication may indicate the UE 115-*e* to monitor for PEIs using a camping beam (e.g., a beam of the network entity 105-*c* that the UE 115-*e* is camped on), if the camping beam of UE 115-*e* is the beam where the last connection of UE 115-*e* was released, i.e., the camping beam is the last used beam of UE 115-*e***.

At 510, the UE **115-*e* may determine a set of beams associated with PEI monitoring. For example, the UE 115-*e* may obtain an indication associated with a camping beam (e.g., a beam of the network entity 105-*c* that the UE 115-*e* is camped on) that indicates the set of beams associated with PEI monitoring. In some cases, the UE 115-*e* may obtain the indication associated with the camping beam the set of beams based on the message received from the network entity 105-*c* containing the indication. Alternatively, the UE 115-*e* may autonomously determine an indication of the set of beams. For example, the network entity 105-*c* may have transmitted previous signaling to the UE 115-*e* indicating information about beams of the network entity 105-*c* (e.g., a set of SSB beams and corresponding indices), which may assist the UE 115-*e* in determining neighbor beams to the current camping beam. The set of beams may be the camping beam, and, in some cases, the set of beams may additionally include one or more neighboring beams (e.g., beams with consecutive beam indices) to the camping beam. In some examples, the UE 115-*e* may determine the set of beams based on a previous signaling form the network entity 105-*c***, technical specifications (e.g., pre-configured specifications), or a combination thereof.

At 515, the UE **115-*e* may determine that the last used beam of the UE 115-*e* is excluded from (e.g., is not within) the set of beams. For example, the UE 115-*e* may determine the last used beam of the UE 115-*e* is not included within the set of beams based on the index of the last used beam. In some examples, the UE 115-*e* may store last used beam information after a connection release, and the UE 115-*e* may read the stored information to determine whether the last used beam is contained within the set of beams. The UE 115-*e* may determine to skip monitoring for PEI via the current camping beam based on the last used beam of the UE 115-*e*** being excluded from the set of beams.

At 520, the UE **115-*e* may refrain from monitoring for the PEI based on the last used beam of the UE 115-*e* being excluded from the set of beams. Additionally, the network entity 105-*c* may refrain from transmitting a PEI indicating a paging subgroup for the UE 115-*e*. For example, the network entity 105-*c* may determine that a paging message is to be transmitted to UE 115-*e*, and the network entity 105-*c* may determine that the last used beam of the UE 115-*e* is not contained in the set of beams associated to the camping beam of the UE 115-*e*. Accordingly, the network entity 105-*c* and may skip transmitting PEI for the UE 115-*e* via the camping beam of the UE 115-*e***.

At 525, the network entity **105-*c* may transmit a paging message during a PO of the UE 115-*e*. The UE 115-*e* may monitor the PO for the paging message despite not having monitored for and detected a PEI in response to determining that the last used beam is not within the set of beams associated to the camping beam of the UE 115-*e***.

Figure 6:
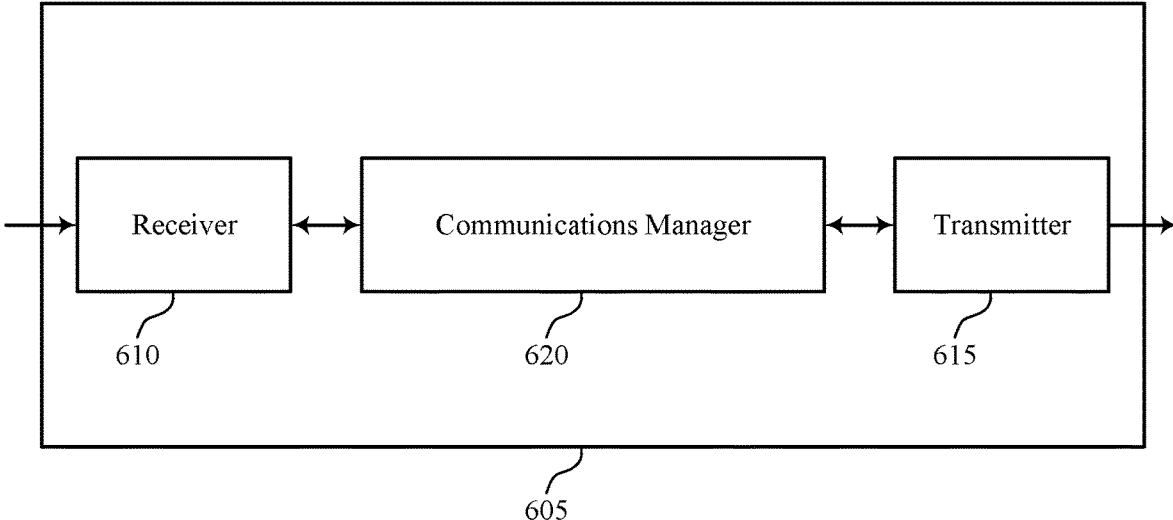
FIGS. 6 and 7 show block diagrams of devices that support PEIs in NTNs in accordance with one or more aspects of the present disclosure.

FIG. 6 shows a block diagram 600 of a device 605 that supports PEIs in NTNs in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to PEIs in NTNs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to PEIs in NTNs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of PEIs in NTNs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for communicating, via a first beam associated with a communication between the UE and a network entity, a connection release message to release a connection. The communications manager 620 may be configured as or otherwise support a means for obtaining an indication associated with a second beam, the indication indicating a set of one or more beams associated with a PEI. The communications manager 620 may be configured as or otherwise support a means for monitoring, via the second beam, for a paging message based on whether the first beam is included in the set of one or more beams associated with the PEI.

By including or configuring the communications manager 620 in accordance with examples as described herein, the device 605 (e.g., a processor controlling or otherwise coupled with the receiver 610, the transmitter 615, the communications manager 620, or a combination thereof)

may support techniques for PEI transmissions in NTNs with reduced power consumption and more efficient utilization of communication resources.

Figure 7:
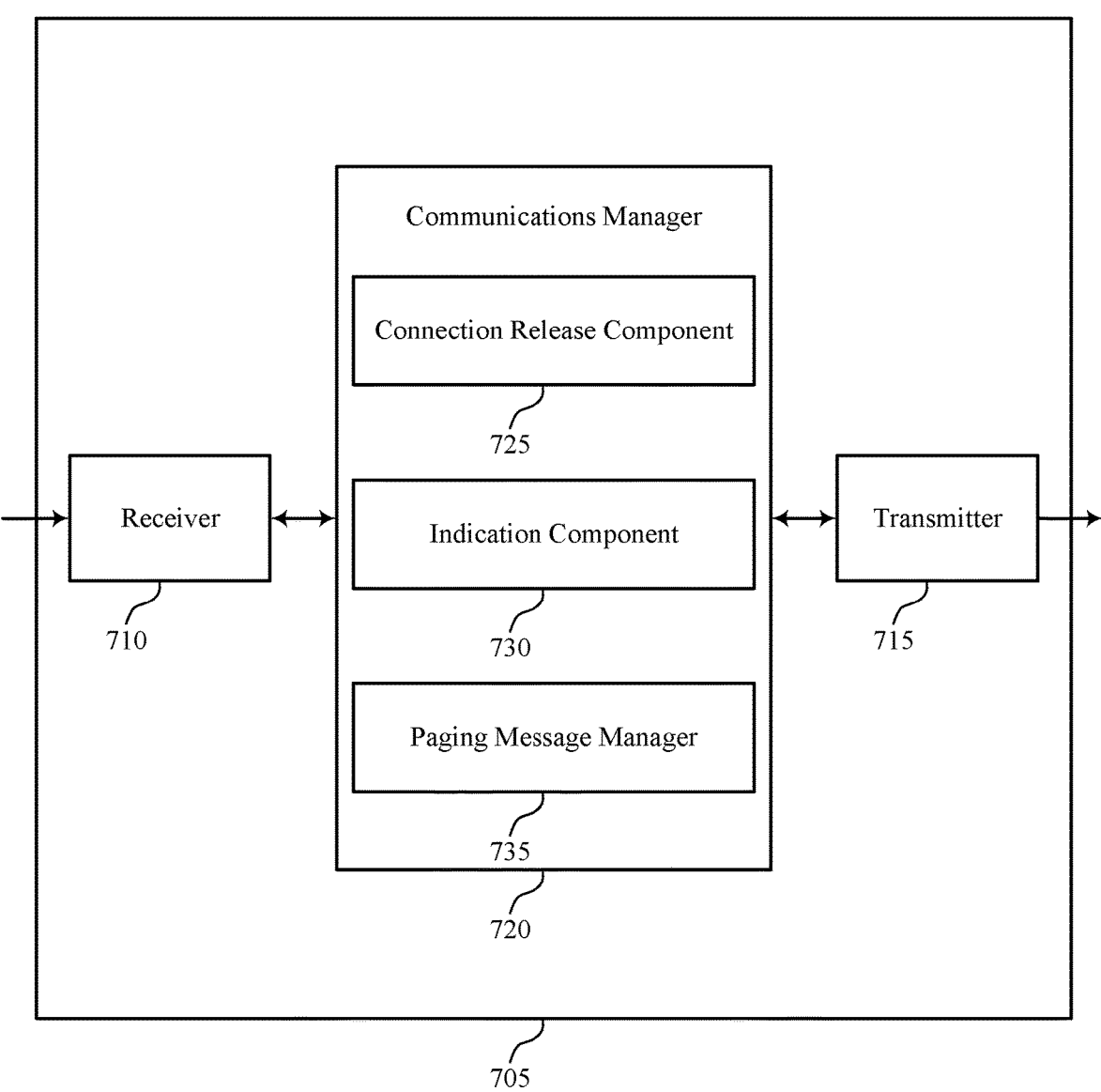

FIG. 7 shows a block diagram 700 of a device 705 that supports PEIs in NTNs in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to PEIs in NTNs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to PEIs in NTNs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of PEIs in NTNs as described herein. For example, the communications manager 720 may include a connection release component 725, an indication component 730, a paging message manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The connection release component 725 may be configured as or otherwise support a means for communicating, via a first beam associated with a communication between the UE and a network entity, a connection release message to release a connection. The indication component 730 may be configured as or otherwise support a means for obtaining an indication associated with a second beam, the indication indicating a set of one or more beams associated with a PEI. The paging message manager 735 may be configured as or otherwise support a means for monitoring, via the second beam, for a paging message based on whether the first beam is included in the set of one or more beams associated with the PEI.

Figure 8:
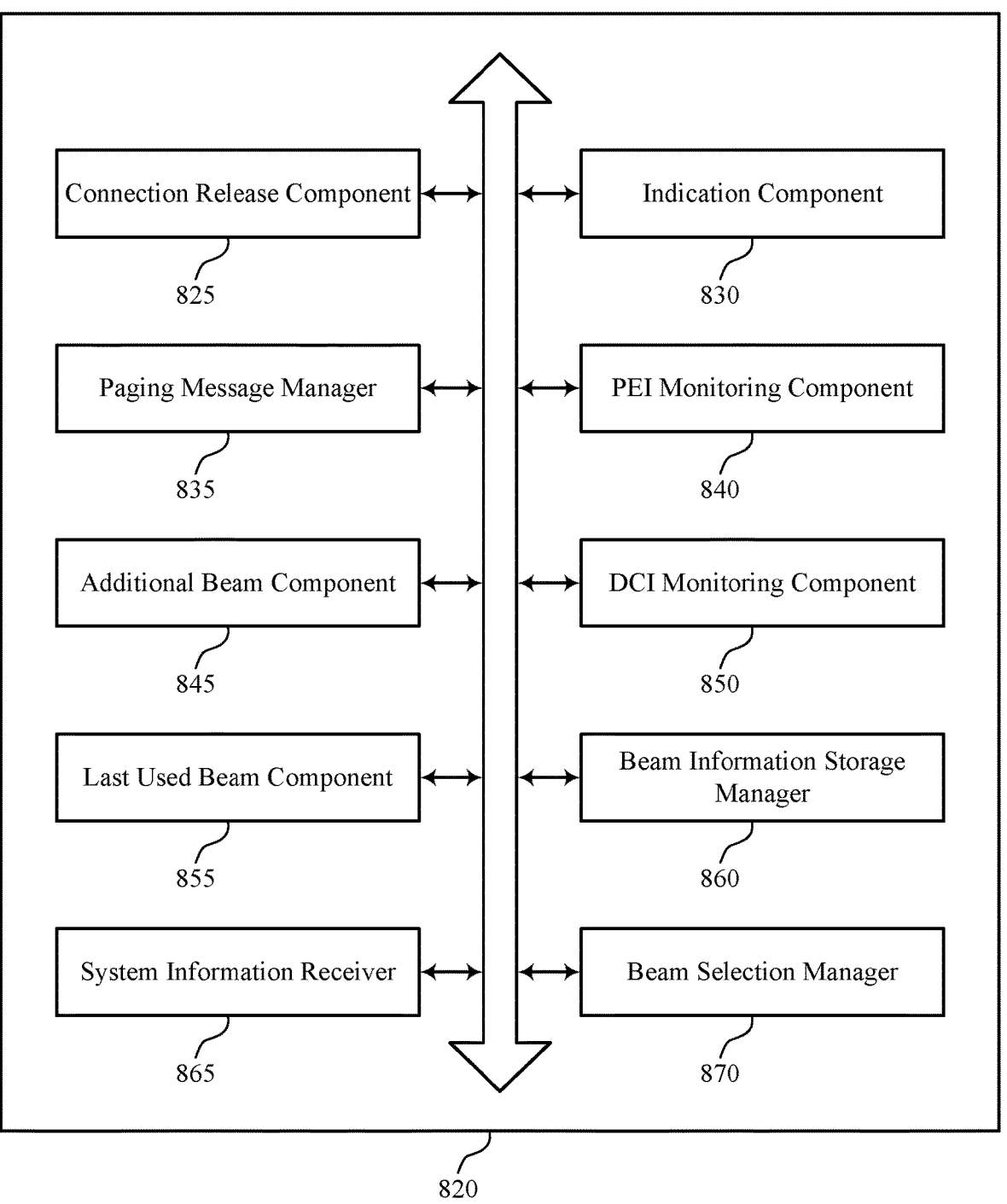
FIG. 8 shows a block diagram of a communications manager that supports PEIs in NTNs in accordance with one or more aspects of the present disclosure.

FIG. 8 shows a block diagram 800 of a communications manager 820 that supports PEIs in NTNs in accordance with one or more aspects of the present disclosure. The communications manager 820 may be an example of aspects of a communications manager 620, a communications manager 720, or both, as described herein. The communications manager 820, or various components thereof, may be an example of means for performing various aspects of PEIs in NTNs as described herein. For example, the communications manager 820 may include a connection release component 825, an indication component 830, a paging message manager 835, a PEI monitoring component 840, an additional beam component 845, a DCI monitoring component 850, a last used beam component 855, a beam information storage manager 860, a system information receiver 865, a beam selection manager 870, or any combination thereof. Each of these components may communicate, directly or indirectly, with one another (e.g., via one or more buses).

The communications manager 820 may support wireless communications at a UE in accordance with examples as disclosed herein. The connection release component 825 may be configured as or otherwise support a means for communicating, via a first beam associated with a communication between the UE and a network entity, a connection release message to release a connection. The indication component 830 may be configured as or otherwise support a means for obtaining an indication associated with a second beam, the indication indicating a set of one or more beams associated with a PEI. The paging message manager 835 may be configured as or otherwise support a means for monitoring, via the second beam, for a paging message based on whether the first beam is included in the set of one or more beams associated with the PEI.

In some examples, the PEI monitoring component 840 may be configured as or otherwise support a means for monitoring, via the second beam, for the PEI based on the first beam being included in the set of one or more beams.

In some examples, the DCI monitoring component 850 may be configured as or otherwise support a means for monitoring, using the second beam, for downlink control information associated with a PO based on reception of the PEI. In some examples, the first beam and the second beam are the same.

In some examples, the additional beam component 845 may be configured as or otherwise support a means for receiving, from the network entity, an indication of one or more additional beams, the one or more additional beams and the second beam having neighboring beam coverage areas, the set of one or more beams including the second beam and the one or more additional beams.

In some examples, the DCI monitoring component 850 may be configured as or otherwise support a means for monitoring, via the second beam, for downlink control information associated with a PO based on the first beam being excluded from the set of one or more beams.

In some examples, the last used beam component 855 may be configured as or otherwise support a means for receiving, from the network entity, a last-used-beam-only indication, where the indication associated with the second beam is obtained based on the last-used-beam-only indication.

In some examples, the beam information storage manager 860 may be configured as or otherwise support a means for storing an indication of the first beam associated with a most recent communication between the UE and the network entity, where the paging message is monitored based on the stored indication of the first beam. In some examples, the first beam is associated with a most recent communication between the UE and the network entity.

In some examples, the system information receiver 865 may be configured as or otherwise support a means for receiving, from a network entity and via the second beam, a system information block indicating the set of one or more beams associated with the PEI.

In some examples, the beam selection manager 870 may be configured as or otherwise support a means for selecting a third beam as a camping beam (e.g., a camping beam of the UE) used to monitor one or more channels associated with the network entity. In some examples, the system information receiver 865 may be configured as or otherwise support a means for receiving, from a network entity and via the third beam, a system information block indicating a second set of one or more beams associated with the PEI.

Figure 9:
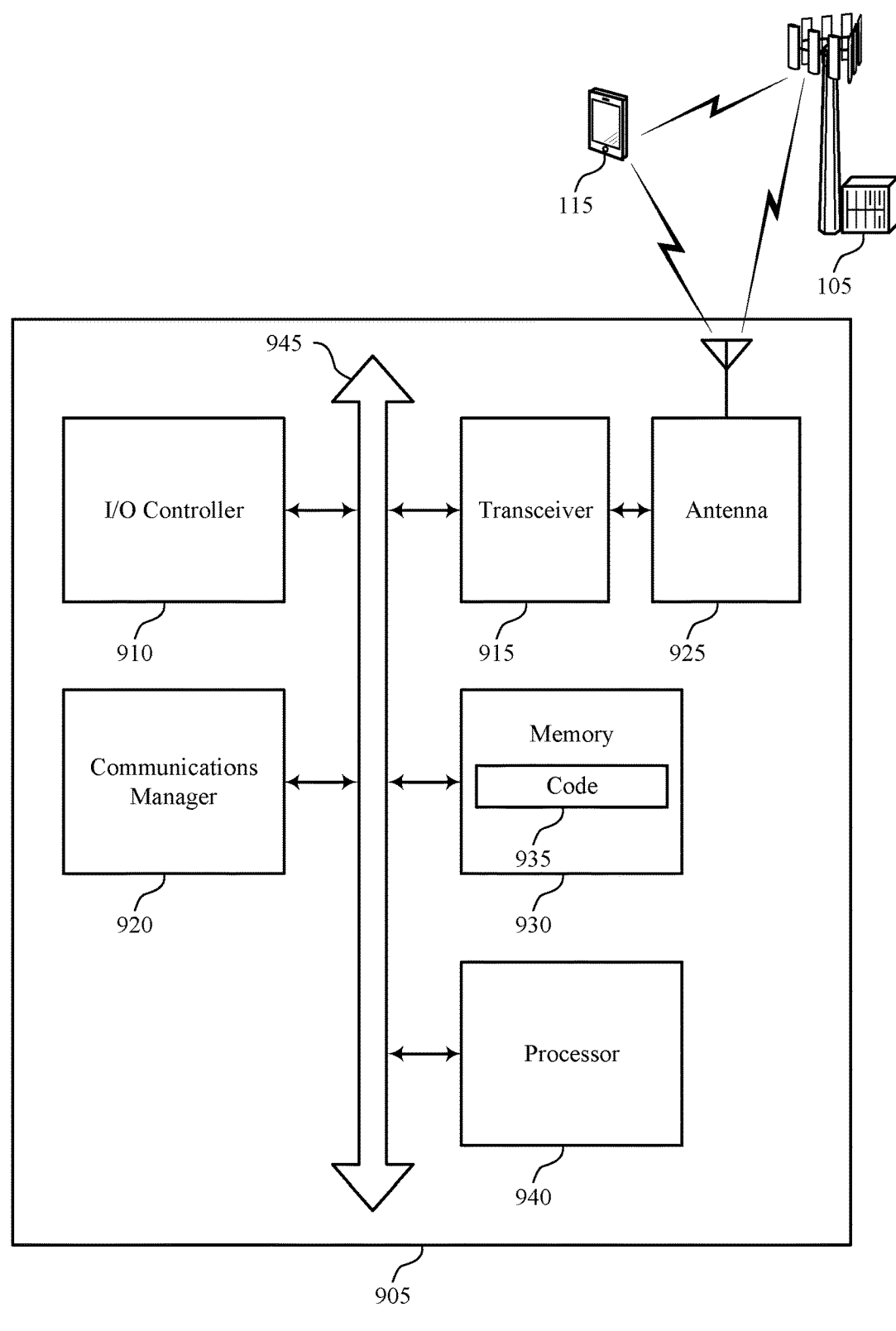
FIG. 9 shows a diagram of a system including a device that supports PEIs in NTNs in accordance with one or more aspects of the present disclosure.

FIG. 9 shows a diagram of a system 900 including a device 905 that supports PEIs in NTNs in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting PEIs in NTNs). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for communicating, via a first beam associated with a communication between the UE and a network entity, a connection release message to release a connection. The communications manager 920 may be configured as or otherwise support a means for obtaining an indication associated with a second beam, the indication indicating a set of one or more beams associated with a PEI. The communications manager 920 may be configured as or otherwise support a means for monitoring, via the second beam, for a paging message based on whether the first beam is included in the set of one or more beams associated with the PEI.

By including or configuring the communications manager 920 in accordance with examples as described herein, the device 905 may support techniques for PEI transmissions in NTNs with reduced power consumption and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of PEIs in NTNs as described herein, or the processor 940 and the memory 930 may be otherwise configured to perform or support such operations.

Figure 10:
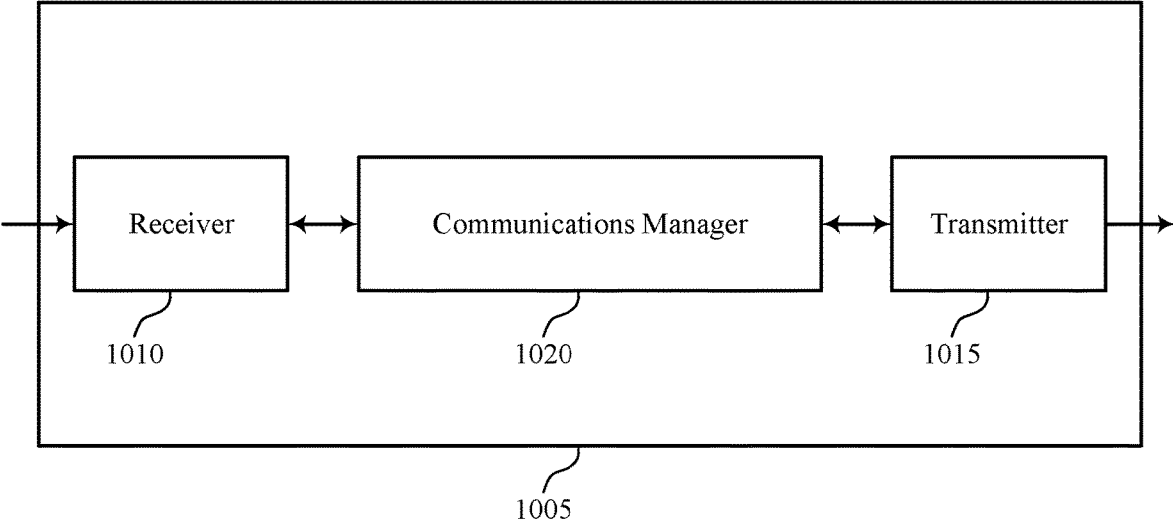
FIGS. 10 and 11 show block diagrams of devices that support PEIs in NTNs in accordance with one or more aspects of the present disclosure.

FIG. 10 shows a block diagram 1000 of a device 1005 that supports PEIs in NTNs in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of PEIs in NTNs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for communicating a connection release message via a first beam to release a connection associated with a UE. The communications manager 1020 may be configured as or otherwise support a means for determining a set of one or more beams associated with a second beam and a PEI. The communications manager 1020 may be configured as or otherwise support a means for outputting the PEI based on the set of one or more beams associated with the PEI.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for PEI transmissions in NTNs with reduced power consumption and more efficient utilization of communication resources.

Figure 11:
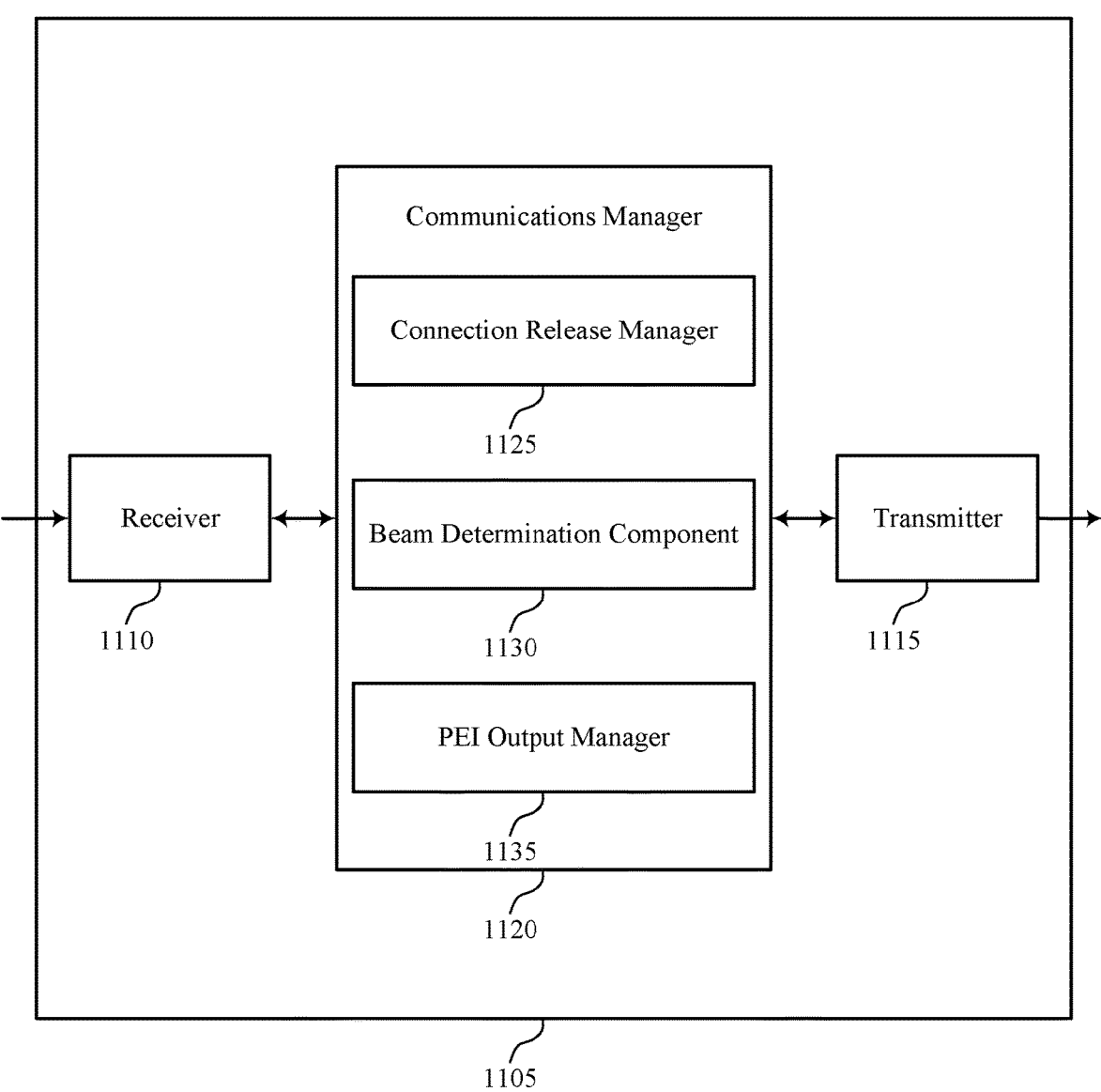

FIG. 11 shows a block diagram 1100 of a device 1105 that supports PEIs in NTNs in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of PEIs in NTNs as described herein. For example, the communications manager 1120 may include a connection release manager 1125, a beam determination component 1130, a PEI output manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The connection release manager 1125 may be configured as or otherwise support a means for communicating a connection release message via a first beam to release a connection associated with a UE. The beam determination component 1130 may be configured as or otherwise support a means for determining a set of one or more beams associated with a second beam and a PEI. The PEI output manager 1135 may be configured as or otherwise support a means for outputting the PEI based on the set of one or more beams associated with the PEI.

Figure 12:
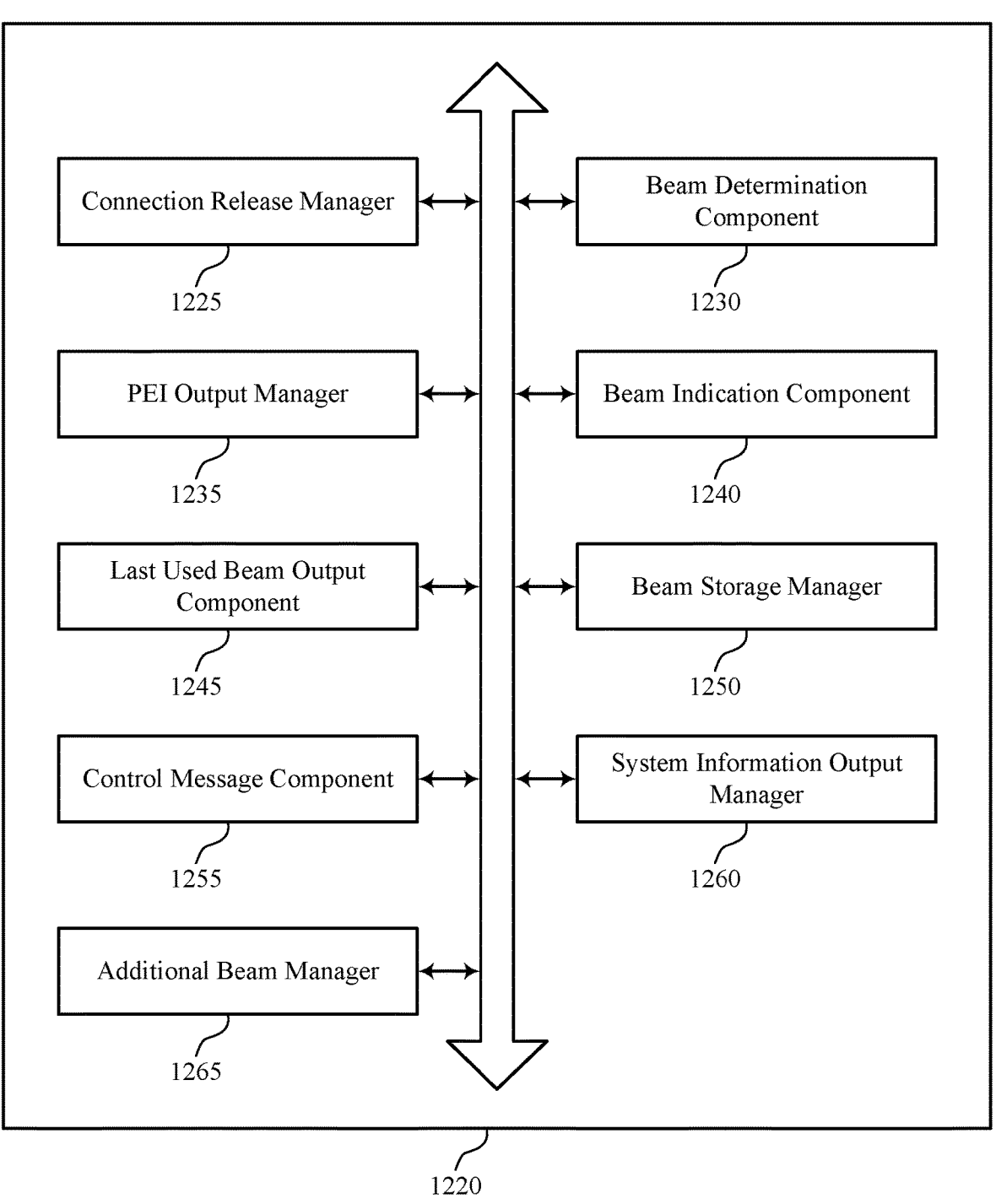
FIG. 12 shows a block diagram of a communications manager that supports PEIs in NTNs in accordance with one or more aspects of the present disclosure.

FIG. 12 shows a block diagram 1200 of a communications manager 1220 that supports PEIs in NTNs in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of PEIs in NTNs as described herein. For example, the communications manager 1220 may include a connection release manager 1225, a beam determination component 1230, a PEI output manager 1235, a beam indication component 1240, a last used beam output component 1245, a beam storage manager 1250, a control message component 1255, a system information output manager 1260, an additional beam manager 1265, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The connection release manager 1225 may be configured as or otherwise support a means for communicating a connection release message via a first beam to release a connection associated with a UE. The beam determination component 1230 may be configured as or otherwise support a means for determining a set of one or more beams associated with a second beam and a PEI. The PEI output manager 1235 may be configured as or otherwise support a means for outputting the PEI based on the set of one or more beams associated with the PEI.

In some examples, the beam indication component 1240 may be configured as or otherwise support a means for outputting, to the UE and via the second beam, an indication of the set of one or more beams.

In some examples, to support outputting the indication of the set of one or more beams, the system information output manager 1260 may be configured as or otherwise support a means for outputting a system information block that indicates the set of one or more beams associated with the PEI.

In some examples, the last used beam output component 1245 may be configured as or otherwise support a means for outputting a last-used-beam-only indication, where the set of one or more beams associated with the PEI is determined based on the last-used-beam-only indication being outputted.

In some examples, the PEI output manager 1235 may be configured as or otherwise support a means for outputting, using the second beam, the PEI based on the first beam being included in the set of one or more beams associated with the PEI.

In some examples, the additional beam manager 1265 may be configured as or otherwise support a means for outputting an indication of one or more additional beams, the one or more additional beams and the second beam having neighboring beam coverage areas, where the set of one or more beams includes the second beam and the one or more additional beams. In some examples, the first beam and the second beam are the same. In some examples, the first beam is associated with a most recent transmission between the UE and the network entity.

In some examples, the beam storage manager 1250 may be configured as or otherwise support a means for storing an indication of the first beam, where the PEI is outputted based on storing the indication of the first beam.

In some examples, the control message component 1255 may be configured as or otherwise support a means for outputting a control message during a PO based on outputting the PEI.

Figure 13:
FIG. 13 shows a diagram of a system including a device that supports PEIs in NTNs in accordance with one or more aspects of the present disclosure.

FIG. 13 shows a diagram of a system 1300 including a device 1305 that supports PEIs in NTNs in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting PEIs in NTNs). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for communicating a connection release message via a first beam to release a connection associated with a UE. The communications manager 1320 may be configured as or otherwise support a means for determining a set of one or more beams associated with a second beam and a PEI. The communications manager 1320 may be configured as or otherwise support a means for outputting the PEI based on the set of one or more beams associated with the PEI.

By including or configuring the communications manager 1320 in accordance with examples as described herein, the device 1305 may support techniques for PEI transmissions in NTNs with reduced power consumption and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of PEIs in NTNs as described herein, or the processor 1335 and the memory 1325 may be otherwise configured to perform or support such operations.

FIG. 14 shows a flowchart illustrating a method 1400 that supports PEIs in NTNs in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include communicating, via a first beam associated with a communication between the UE and a network entity, a connection release message to release a connection. The operations of 1405 may be performed in accordance with examples as disclosed herein. In some examples, aspects of the operations of 1405 may be performed by a connection release component 825 as described with reference to FIG. 8.

At 1410, the method may include obtaining an indication associated with a second beam, the indication indicating a set of one or more beams associated with a PEI. The operations of 1410 may be performed in accordance with examples as disclosed herein. In some examples, aspects of the operations of 1410 may be performed by an indication component 830 as described with reference to FIG. 8.

At 1415, the method may include monitoring, via the second beam, for a paging message based on whether the first beam is included in the set of one or more beams associated with the PEI. The operations of 1415 may be performed in accordance with examples as disclosed herein. In some examples, aspects of the operations of 1415 may be performed by a paging message manager 835 as described with reference to FIG. 8.

Figure 15:
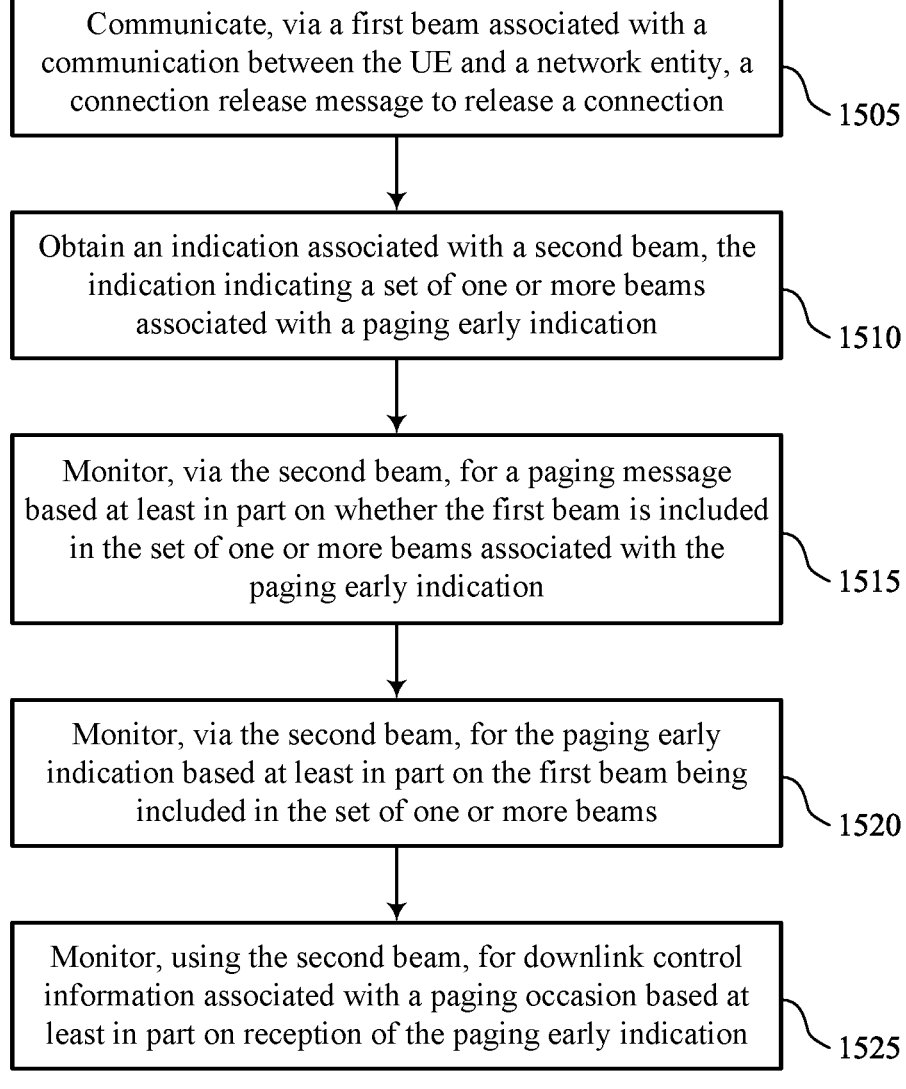

FIG. 15 shows a flowchart illustrating a method 1500 that supports PEIs in NTNs in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include communicating, via a first beam associated with a communication between the UE and a network entity, a connection release message to release a connection. The operations of 1505 may be performed in accordance with examples as disclosed herein. In some examples, aspects of the operations of 1505 may be performed by a connection release component 825 as described with reference to FIG. 8.

At 1510, the method may include obtaining an indication associated with a second beam, the indication indicating a set of one or more beams associated with a PEI. The operations of 1510 may be performed in accordance with examples as disclosed herein. In some examples, aspects of the operations of 1510 may be performed by an indication component 830 as described with reference to FIG. 8.

At 1515, the method may include monitoring, via the second beam, for a paging message based on whether the first beam is included in the set of one or more beams associated with the PEI. The operations of 1515 may be performed in accordance with examples as disclosed herein. In some examples, aspects of the operations of 1515 may be performed by a paging message manager 835 as described with reference to FIG. 8.

At 1520, the method may include monitoring, via the second beam, for the PEI based on the first beam being included in the set of one or more beams. The operations of 1520 may be performed in accordance with examples as disclosed herein. In some examples, aspects of the operations of 1520 may be performed by a PEI monitoring component 840 as described with reference to FIG. 8.

At 1525, the method may include monitoring, using the second beam, for downlink control information associated with a PO based on reception of the PEI. The operations of 1525 may be performed in accordance with examples as disclosed herein. In some examples, aspects of the operations of 1525 may be performed by a DCI monitoring component 850 as described with reference to FIG. 8.

FIG. 16 shows a flowchart illustrating a method 1600 that supports PEIs in NTNs in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions.

Additionally, or alternatively, the UE may perform aspects of the described functions using special-purpose hardware.

At 1605, the method may include communicating, via a first beam associated with a communication between the UE and a network entity, a connection release message to release a connection. The operations of 1605 may be performed in accordance with examples as disclosed herein. In some examples, aspects of the operations of 1605 may be performed by a connection release component 825 as described with reference to FIG. 8.

At 1610, the method may include obtaining an indication associated with a second beam, the indication indicating a set of one or more beams associated with a PEI. The operations of 1610 may be performed in accordance with examples as disclosed herein. In some examples, aspects of the operations of 1610 may be performed by an indication component 830 as described with reference to FIG. 8.

At 1615, the method may include monitoring, via the second beam, for a paging message based on whether the first beam is included in the set of one or more beams associated with the PEI. The operations of 1615 may be performed in accordance with examples as disclosed herein. In some examples, aspects of the operations of 1615 may be performed by a paging message manager 835 as described with reference to FIG. 8.

At 1620, the method may include monitoring, via the second beam, for downlink control information associated with a PO based on the first beam being excluded from the set of one or more beams. The operations of 1620 may be performed in accordance with examples as disclosed herein. In some examples, aspects of the operations of 1620 may be performed by a DCI monitoring component 850 as described with reference to FIG. 8.

Figure 17:
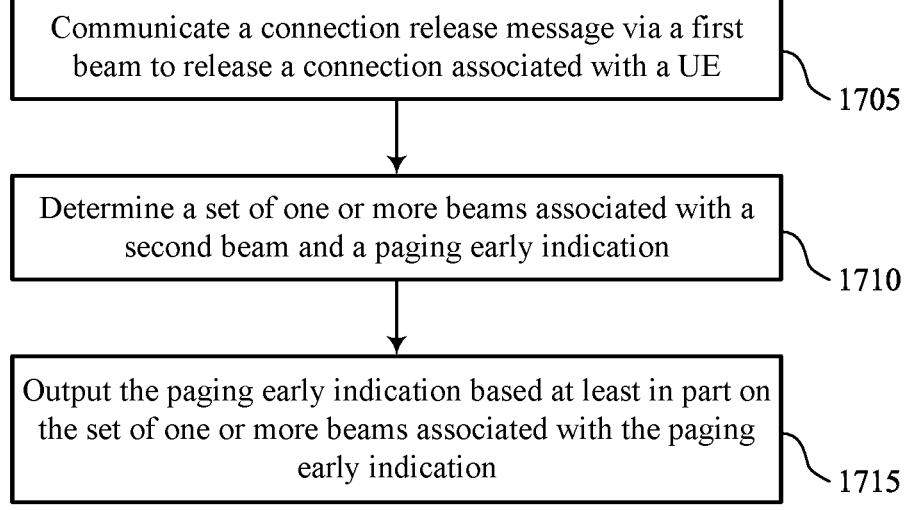

FIG. 17 shows a flowchart illustrating a method 1700 that supports PEIs in NTNs in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include communicating a connection release message via a first beam to release a connection associated with a UE. The operations of 1705 may be performed in accordance with examples as disclosed herein. In some examples, aspects of the operations of 1705 may be performed by a connection release manager 1225 as described with reference to FIG. 12.

At 1710, the method may include determining a set of one or more beams associated with a second beam and a PEI. The operations of 1710 may be performed in accordance with examples as disclosed herein. In some examples, aspects of the operations of 1710 may be performed by a beam determination component 1230 as described with reference to FIG. 12.

At 1715, the method may include outputting the PEI based on the set of one or more beams associated with the PEI. The operations of 1715 may be performed in accordance with examples as disclosed herein. In some examples, aspects of the operations of 1715 may be performed by a PEI output manager 1235 as described with reference to FIG. 12.

FIG. 18 shows a flowchart illustrating a method 1800 that supports PEIs in NTNs in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include communicating a connection release message via a first beam to release a connection associated with a UE. The operations of 1805 may be performed in accordance with examples as disclosed herein. In some examples, aspects of the operations of 1805 may be performed by a connection release manager 1225 as described with reference to FIG. 12.

At 1810, the method may include determining a set of one or more beams associated with a second beam and a PEI. The operations of 1810 may be performed in accordance with examples as disclosed herein. In some examples, aspects of the operations of 1810 may be performed by a beam determination component 1230 as described with reference to FIG. 12.

At 1815, the method may include outputting the PEI based on the set of one or more beams associated with the PEI. The operations of 1815 may be performed in accordance with examples as disclosed herein. In some examples, aspects of the operations of 1815 may be performed by a PEI output manager 1235 as described with reference to FIG. 12.

At 1820, the method may include outputting, to the UE and via the second beam, an indication of the set of one or more beams. The operations of 1820 may be performed in accordance with examples as disclosed herein. In some examples, aspects of the operations of 1820 may be performed by a beam indication component 1240 as described with reference to FIG. 12.

FIG. 19 shows a flowchart illustrating a method 1900 that supports PEIs in NTNs in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include communicating a connection release message via a first beam to release a connection associated with a UE. The operations of 1905 may be performed in accordance with examples as disclosed herein. In some examples, aspects of the operations of 1905 may be performed by a connection release manager 1225 as described with reference to FIG. 12.

At 1910, the method may include determining a set of one or more beams associated with a second beam and a PEI. The operations of 1910 may be performed in accordance with examples as disclosed herein. In some examples, aspects of the operations of 1910 may be performed by a beam determination component 1230 as described with reference to FIG. 12.

At 1915, the method may include outputting the PEI based on the set of one or more beams associated with the PEI. The operations of 1915 may be performed in accordance with examples as disclosed herein. In some examples, aspects of the operations of 1915 may be performed by a PEI output manager 1235 as described with reference to FIG. 12.

At 1920, the method may include outputting a last-used-beam-only indication, where the set of one or more beams associated with the PEI is determined based on the last-used-beam-only indication being outputted. The operations of 1920 may be performed in accordance with examples as disclosed herein. In some examples, aspects of the operations of 1920 may be performed by a last used beam output component 1245 as described with reference to FIG. 12.

The following provides an overview of aspects of the present disclosure:

Aspect 1: A method for wireless communications at a UE, comprising: communicating, via a first beam associated with a communication between the UE and a network entity, a connection release message to release a connection; obtaining an indication associated with a second beam, the indication indicating a set of one or more beams associated with a PEI; and monitoring, via the second beam, for a paging message based at least in part on whether the first beam is included in the set of one or more beams associated with the PEI.

Aspect 2: The method of aspect 1, the monitoring for the paging message comprising: monitoring, via the second beam, for the PEI based at least in part on the first beam being included in the set of one or more beams.

Aspect 3: The method of aspect 2, further comprising: monitoring, using the second beam, for DCI associated with a PO based at least in part on reception of the PEI.

Aspect 4: The method of any of aspects 2 through 3, wherein the first beam and the second beam are the same.

Aspect 5: The method of any of aspects 1 through 4, further comprising: receiving, from the network entity, an indication of one or more additional beams, the one or more additional beams and the second beam having neighboring beam coverage areas, the set of one or more beams comprising the second beam and the one or more additional beams.

Aspect 6: The method of any of aspects 1, 4, and 5, the monitoring for the paging message comprising: monitoring, via the second beam, for DCI associated with a PO based at least in part on the first beam being excluded from the set of one or more beams.

Aspect 7: The method of any of aspects 1 through 6, further comprising: receiving, from the network entity, a last-used-beam-only indication, wherein the indication associated with the second beam is obtained based at least in part on the last-used-beam-only indication.

Aspect 8: The method of any of aspects 1 through 7, further comprising: storing an indication of the first beam associated with a most recent communication between the UE and the network entity, wherein the paging message is monitored based at least in part on the stored indication of the first beam.

Aspect 9: The method of any of aspects 1 through 8, wherein the first beam is associated with a most recent communication between the UE and the network entity.

Aspect 10: The method of any of aspects 1 through 9, the obtaining the indication of the set of one or more beams comprising: receiving, from a network entity and via the second beam, a SIB indicating the set of one or more beams associated with the PEI.

Aspect 11: The method of aspect 10, further comprising: selecting a third beam as a camping beam of the UE used to monitor one or more channels associated with the network entity; and receiving, from a network entity and via the third beam, a SIB indicating a second set of one or more beams associated with the PEI.

Aspect 12: A method for wireless communications at a network entity, comprising: communicating a connection release message via a first beam to release a connection associated with a UE; determining a set of one or more beams associated with a second beam and a PEI; and outputting the PEI based at least in part on the set of one or more beams associated with the PEI.

Aspect 13: The method of aspect 12, further comprising: outputting, to the UE and via the second beam, an indication of the set of one or more beams.

Aspect 14: The method of aspect 13, wherein outputting the indication of the set of one or more beams further comprises: outputting a SIB that indicates the set of one or more beams associated with the PEI.

Aspect 15: The method of any of aspects 12 through 14, further comprising: outputting a last-used-beam-only indication, wherein the set of one or more beams associated with the PEI is determined based at least in part on the last-used-beam-only indication being outputted.

Aspect 16: The method of any of aspects 12 through 15, the outputting the PEI comprising: outputting, using the second beam, the PEI based at least in part on the first beam being included in the set of one or more beams associated with the PEI.

Aspect 17: The method of aspect 16, further comprising: outputting an indication of one or more additional beams, the one or more additional beams and the second beam having neighboring beam coverage areas, wherein the set of one or more beams comprises the second beam and the one or more additional beams.

Aspect 18: The method of any of aspects 12 through 17, wherein the first beam and the second beam are the same.

Aspect 19: The method of any of aspects 12 through 18, wherein the first beam is associated with a most recent transmission between the UE and the network entity.

Aspect 20: The method of any of aspects 12 through 19, further comprising: storing an indication of the first beam, wherein the PEI is outputted based at least in part on storing the indication of the first beam.

Aspect 21: The method of any of aspects 12 through 20, further comprising: outputting a control message during a PO based at least in part on outputting the PEI.

Aspect 22: An apparatus for wireless communications at a UE, comprising a processor; and memory coupled with the processor, the processor configured to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by a processor to perform a method of any of aspects 1 through 11.

Aspect 25: An apparatus for wireless communications at a network entity, comprising a processor; and memory coupled with the processor, the processor configured to perform a method of any of aspects 12 through 21.

Aspect 26: An apparatus for wireless communications at a network entity, comprising at least one means for performing a method of any of aspects 12 through 21.

Aspect 27: A non-transitory computer-readable medium storing code for wireless communications at a network entity, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magneti-cally, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving infor-mation), accessing (e.g., accessing data stored in memory) and the like. Also, "determining" can include resolving, obtaining, selecting, choosing, establishing, and other such similar actions.

In the appended figures, similar components or features may have the same reference label. Further, various com-ponents of the same type may be distinguished by following the reference label by a dash and a second label that distinguishes among the similar components. If just the first reference label is used in the specification, the description is applicable to any one of the similar components having the same first reference label irrespective of the second refer-ence label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advanta-geous over other examples." The detailed description includes specific details for the purpose of providing an understanding of the described techniques. These tech-niques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more memories; and
   one or more processors coupled with the one or more memories and configured to cause the UE to:
      communicate, via a first beam associated with a com-munication between the UE and a network entity, a connection release message to release a connection;
      obtain, via a third beam, an indication of a set of one or more second beams to be used to determine whether to monitor the third beam for a paging early indica-tion or to skip the paging early indication being monitored; and
      monitor, via the third beam, for one of the paging early indication based at least in part on the set of one or more second beams comprising the first beam used for communication of the connection release mes-sage or for downlink control information associated with a paging occasion if the paging early indication is skipped, wherein the paging early indication is skipped based at least in part on the set of one or more second beams excluding the first beam used for communication of the connection release message.

2. The apparatus of claim 1, wherein, to monitor for the paging early indication or for the downlink control infor-mation associated with the paging occasion, the one or more processors are configured to cause the UE to:
   monitor, via the third beam, for the paging early indica-tion based at least in part on inclusion of the first beam in the set of one or more second beams.

3. The apparatus of claim 2, wherein the one or more processors are configured to cause the UE to:
   monitor, using the third beam, for the downlink control information associated with the paging occasion based at least in part on reception of the paging early indi-cation.

4. The apparatus of claim 1, wherein the one or more processors are configured to cause the UE to:
   receive, from the network entity, an indication of one or more additional beams, the one or more additional beams and the third beam having neighboring beam coverage areas, the set of one or more second beams comprising the one or more additional beams.

5. The apparatus of claim 1, wherein, to monitor for the paging early indication or for the downlink control infor-mation associated with the paging occasion, the one or more processors are configured to cause the UE to:
   monitor, via the third beam, for the downlink control information associated with the paging occasion based at least in part on the first beam being excluded from the set of one or more second beams.

6. The apparatus of claim 1, wherein the one or more processors are configured to cause the UE to:
   receive, from the network entity, a last-used-beam-only indication, wherein the indication of the set of one or more second beams is obtained based at least in part on the last-used-beam-only indication.

7. The apparatus of claim 1, wherein the one or more processors are configured to cause the UE to:

store an indication of the first beam associated with a most recent communication between the UE and the network entity, wherein the paging early indication or the downlink control information associated with the paging occasion is monitored for based at least in part on the indication of the first beam.

8. The apparatus of claim 1, wherein the first beam is associated with a most recent communication between the UE and the network entity.

9. The apparatus of claim 1, wherein, to obtain the indication of the set of one or more second beams, the one or more processors are configured to cause the UE to:

receive, from the network entity and via the third beam, a system information block indicative of the set of one or more second beams.

10. The apparatus of claim 9, wherein the one or more processors are configured to cause the UE to:

select a fourth beam as a camping beam used to monitor one or more channels associated with the network entity; and receive, from the network entity and via the fourth beam, a system information block indicative of a second set of one or more fifth beams associated with the paging early indication.

11. The apparatus of claim 1, further comprising:

one or more antennas configured to communicate, via the first beam associated with the communication between the UE and the network entity, the connection release message to release the connection.

12. An apparatus for wireless communications at a network entity, comprising:

one or more memories; and one or more processors coupled with the one or more memories and configured to cause the network entity to:

communicate a connection release message via a first beam to release a connection associated with a user equipment (UE); and output, via a third beam, a paging early indication based at least in part on a set of one or more second beams, the set of one or more second beams indicative of whether the UE is to monitor the third beam for the paging early indication or to skip the paging early indication being monitored.

13. The apparatus of claim 12, wherein the one or more processors are configured to cause the network entity to:

output, to the UE and via the third beam, an indication of the set of one or more second beams.

14. The apparatus of claim 12, wherein the one or more processors are configured to cause the network entity to:

output a last-used-beam-only indication, wherein the set of one or more second beams is determined based at least in part on the last-used-beam-only indication being outputted.

15. The apparatus of claim 12, wherein, to output the paging early indication, the one or more processors are configured to cause the network entity to:

output, using the third beam, the paging early indication based at least in part on the first beam being included in the set of one or more second beams.

16. The apparatus of claim 15, wherein the one or more processors are configured to cause the network entity to:

output an indication of one or more additional beams, the one or more additional beams and the third beam having neighboring beam coverage areas, wherein the set of one or more second beams comprises and the one or more additional beams.

17. The apparatus of claim 12, wherein the first beam is associated with a most recent transmission between the UE and the network entity.

18. The apparatus of claim 12, wherein the one or more processors are configured to cause the network entity to:

store an indication of the first beam, wherein the paging early indication is outputted based at least in part on the indication of the first beam being stored.

19. The apparatus of claim 12, further comprising:

one or more antennas configured to communicate the connection release message via the first beam to release the connection associated with the UE.

20. A method for wireless communications at a user equipment (UE), comprising:

communicating, via a first beam associated with a communication between the UE and a network entity, a connection release message to release a connection;

obtaining, via a third beam, an indication of a set of one or more second beams to be used to determine whether to monitor the third beam for a paging early indication or to skip the paging early indication being monitored; and monitoring, via the third beam, for one of the paging early indication based at least in part on the set of one or more second beams comprising the first beam used for communication of the connection release message or for downlink control information associated with a paging occasion if the paging early indication is skipped, wherein the paging early indication is skipped based at least in part on the set of one or more second beams excluding the first beam used for communication of the connection release message.

21. The method of claim 20, wherein monitoring for the paging early indication or for the downlink control information associated with the paging occasion comprises:

monitoring, via the third beam, for the paging early indication based at least in part on the first beam being included in the set of one or more second beams.

22. The method of claim 20, wherein monitoring for the paging early indication or for the downlink control information associated with the paging occasion comprises:

monitoring, via the third beam, for the downlink control information associated with the paging occasion based at least in part on the first beam being excluded from the set of one or more second beams.

23. A method for wireless communications at a network entity, comprising:

communicating a connection release message via a first beam to release a connection associated with a user equipment (UE); and outputting, via a third beam, a paging early indication based at least in part on a set of one or more second beams, the set of one or more second beams indicative of whether the UE is to monitor the third beam for the paging early indication or to skip the paging early indication being monitored.

24. The method of claim 23, further comprising:

outputting, to the UE and via the third beam, an indication of the set of one or more second beams.

25. The method of claim 23, wherein outputting the paging early indication comprises:

outputting, using the third second beam, the paging early indication based at least in part on the first beam being included in the set of one or more second beams.

26. A non-transitory computer-readable medium storing code for wireless communications, the code comprising instructions executable by one or more processors to:

communicate, via a first beam associated with a communication between a user equipment (UE) and a network entity, a connection release message to release a connection;

obtain, via a third beam, an indication of a set of one or more second beams to be used to determine whether to monitor the third beam for a paging early indication or to skip the paging early indication being monitored; and monitor, via the third beam, for one of the paging early indication based at least in part on the set of one or more second beams comprising the first beam used for communication of the connection release message or for downlink control information associated with a paging occasion if the paging early indication is skipped, wherein the paging early indication is skipped based at least in part on the set of one or more second beams excluding the first beam used for communication of the connection release message.

27. The non-transitory computer-readable medium of claim 26, wherein the instructions to monitor for the paging early indication or for the downlink control information associated with the paging occasion are executable by the one or more processors to:

monitor, via the third beam, for the paging early indication based at least in part on the first beam being included in the set of one or more second beams.

28. The non-transitory computer-readable medium of claim 26, wherein the instructions to monitor for the paging early indication or for the downlink control information associated with the paging occasion are executable by the one or more processors to:

monitor, via the third beam, for the downlink control information associated with the paging occasion based at least in part on the first beam being excluded from the set of one or more second beams.

29. A non-transitory computer-readable medium storing code for wireless communications, the code comprising instructions executable by one or more processors to:

communicate a connection release message via a first beam to release a connection associated with a user equipment (UE); and output, via a third beam, a paging early indication based at least in part on a set of one or more second beams, the set of one or more second beams indicative of whether the UE is to monitor the third beam for the paging early indication or to skip the paging early indication being monitored.

30. The non-transitory computer-readable medium of claim 29, wherein the instructions are executable by the one or more processors to:

output, to the UE and via the third beam, an indication of the set of one or more second beams.

31. The non-transitory computer-readable medium of claim 29, wherein the instructions to output the paging early indication are executable by the one or more processors to:

output, using the third beam, the paging early indication based at least in part on the first beam being included in the set of one or more second beams.

* * * * *